United States Patent
Sukegawa et al.

(10) Patent No.: US 6,567,603 B1
(45) Date of Patent: May 20, 2003

(54) OPTICAL INTERCONNECTION APPARATUS AND PROCESS FOR FABRICATION OF THE SAME

(75) Inventors: Ken Sukegawa, Shizuoka (JP); Tatsushi Kobayashi, Shizuoka (JP); Ritsu Kawase, Shizuoka (JP); Koichi Arishima, Tokyo (JP); Mamoru Hirayama, Tokyo (JP)

(73) Assignees: Tomoegawa Paper Co., Ltd., Tokyo (JP); Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 09/623,855

(22) PCT Filed: Mar. 12, 1999

(86) PCT No.: PCT/JP99/01211
§ 371 (c)(1),
(2), (4) Date: Oct. 27, 2000

(87) PCT Pub. No.: WO99/46621
PCT Pub. Date: Sep. 16, 1999

(30) Foreign Application Priority Data

Mar. 12, 1998 (JP) ............................................. 10/61341
Jun. 29, 1998 (JP) ........................................... 10/181912
Oct. 13, 1998 (JP) ........................................... 10/290215

(51) Int. Cl.[7] ................................................. G02B 6/00
(52) U.S. Cl. ........................... 385/137; 385/49; 385/114
(58) Field of Search ................................ 385/137, 130, 385/131, 49, 14, 115, 114, 51

(56) References Cited

U.S. PATENT DOCUMENTS

| | | | | |
|---|---|---|---|---|
| 5,024,688 A | * | 6/1991 | Oohashi et al. ............. | 427/166 |
| 5,062,687 A | * | 11/1991 | Sapsford ..................... | 385/128 |
| 5,093,880 A | * | 3/1992 | Matsuda et al. ............ | 385/100 |
| 5,152,817 A | * | 10/1992 | Bennett et al. ............ | 118/50.1 |
| 5,157,755 A | * | 10/1992 | Ooe et al. ................... | 385/127 |
| 5,204,925 A | | 4/1993 | Bonanni et al. .............. | 385/89 |
| 5,292,390 A | | 3/1994 | Burack et al. | |
| 5,444,804 A | * | 8/1995 | Yui et al. ...................... | 385/49 |
| 5,481,633 A | * | 1/1996 | Mayer ......................... | 264/1.1 |
| 5,673,345 A | * | 9/1997 | Saito et al. .................. | 385/129 |
| 5,878,179 A | | 3/1999 | Schricker .................... | 385/100 |
| 5,937,133 A | * | 8/1999 | Moss et al. .................. | 385/137 |
| 5,999,674 A | * | 12/1999 | Yui et al. ...................... | 385/49 |

FOREIGN PATENT DOCUMENTS

| | | |
|---|---|---|
| JP | 47-3773 | 2/1972 |
| JP | 52-112706 | 3/1979 |
| JP | 62-8011 | 2/1987 |
| JP | 6-247747 | 9/1994 |
| JP | 07-1606 | 1/1995 |
| JP | 2574611 | 1/1997 |
| JP | 10-68853 | 3/1998 |

* cited by examiner

Primary Examiner—Lynn D. Feild
Assistant Examiner—Hae Moon Hyeon
(74) Attorney, Agent, or Firm—McDermott, Will & Emery

(57) ABSTRACT

This invention provides optical interconnection apparatus, which permit easy optical interconnections without a loss in the intactness of a routing pattern of optical fibers, and also their fabrication processes. An optical interconnection apparatus according to this invention has a base film having a two-dimensional plane, plural optical fibers routed on the base film an edge-dam arranged along or in a vicinity of a peripheral edge of the base film, a protective resin layer holding in place and protecting the plural optical fibers routed on the two-dimensional plane of the base film, and end portions located at opposite ends of the optical fibers and adapted to permit optical interconnections. The protective resin layer is formed, for example, by filling a resin material inside the edge-dam arranged along or in the vicinity of the peripheral edge of the base film and then solidifying it.

27 Claims, 8 Drawing Sheets

OPTICAL INTERCONNECTION APPARATUS AND PROCESS FOR FABRICATION OF THE SAME

TECHNICAL FIELD

This invention relates to optical interconnection apparatus (optical circuit board) for mutually connecting optical component, parts and/or devices used in optical communications or optical information processing, such as optical components, optical circuit packs and optical circuit devices, and also to fabrication process thereof.

BACKGROUND ART

To permit optical interconnections between plural optical components in an optical circuit pack or optical interconnections between plural optical circuit packs or between optical circuit devices on each of which optical packs are mounted, these optical components, optical circuit packs and optical circuit devices are provided at terminals thereof with optical connectors to interconnect them together via optical fibers. As these optical fibers have to be arranged with loose in this case, it is a current circumstance that, on an optical circuit pack or inside and/or on a back side of an optical circuit devices, intricately routed lines of the optical fibers extend overlapping one another in the form of a bird's nest and hence occupy a large space. For an optical interconnection process which is complex and requires a large space as described above, a proposal has been made, as a simple process anywhere routing of optical fibers on a two-dimensional plane as desired, to use a sheet or substrate with a pressure-sensitive adhesive coated thereon and to hold optical fibers in place by the pressure-sensitive adhesive as disclosed in JP 2,574,611 B.

Incidentally, the optical interconnection apparatus disclosed in JP 2,574,611 B is obtained in such a way that upon its fabrication, optical fibers are located by a pressure-sensitive adhesive, which is coated on a 25–200 μm thick, flexible polymer film substrate (base layer) made of "Mylar" or "Kapton" or on fiber jackets, to form a routing pattern and the routing pattern is then covered with the same material as the material used for the substrate, whereby a protective layer is formed. This process is however accompanied by problems in that as optical fibers so located increase in number and the optical fibers increase more overlapped portions (cross-over routing) in the routing pattern so formed, the resulting routing layer of the optical fibers becomes thicker and, because the tacky surface with which the optical fibers are in contact becomes smaller at the overlapped portions of the optical fibers, the protective layer cannot be arranged evenly. There is a further problem in that at the overlapped portions of the optical fibers in the routing pattern, the fixing force by the pressure-sensitive adhesive becomes weaker and the optical fibers are allowed to move, thereby resulting in displacements in the routing pattern (a loss in the intactness of the routing pattern). Moreover, general optical fibers range from 125 to 250 μm in diameter so that at an overlapped area of three optical fibers, for example, the routing layer of the optical fibers becomes as thick as 375 to 750 μm. An increase in the overlapped portions of optical fibers in a routing pattern develops lifted portions (air pockets) in a protective layer around optical fibers underneath the protective layer, so that a problem arises in the reliability against temperatures and humidities and in addition, the optical circuit board becomes extremely weak to breakage which may be caused by deformation such as bending. Moreover, the optical interconnection apparatus fabricated by this process includes polymer substrates, which do not have stretchability despite their flexibility, above and below a layer formed of the optical fibers and the pressure-sensitive adhesive and having a thickness of from several hundreds micrometers to several millimeters, and is thus accompanied by a still further problem that the optical interconnection apparatus is provided with reduced flexibility despite the need for high flexibility. The optical interconnection apparatus disclosed in Japanese Patent No. 2,574,611 B is provided at portions thereof, which are adapted for interconnections, with extended tabs. Extension of these tabs, however, results in the occupation of a greater space by the interconnecting portions and also leads to complication in the fabrication of the optical interconnection apparatus.

On the other hand, U.S. Pat. No. 5,292,390 discloses a process for filling a layer of routed optical fibers with a thermoplastic polyurethane to hold the optical fibers in place and also to protect the optical fibers. The problem of a reduction in flexibility, however, remains still unresolved in this process because "Kapton" films, which have low stretchability although their flexibility is high, are used as a substrate for an adhesive layer and a substrate for a thermoplastic polyurethane layer, said layers serving to hold the optical fibers in place, and the layer routing optical fibers also remain held between these films after the fabrication of an optical interconnection apparatus. Further, the polyurethane layer has stiffness despite its flexibility and therefore, stress tends to be applied to optical fibers held in place and protected by it and tends to result in an optical loss. There is accordingly a problem in protecting the optical fibers and holding them in place.

JP 10-68853 A, on the other hand, discloses to fabricate an optical interconnection apparatus by locating optical fibers between laminates, in each of which a film substrate and an adhesive layer are provided with a layer having compressibility, and holding the resulting optical fiber routing layer between the laminate. The layers having compressibility in that invention, however, are arranged to reduce pressures which may be applied to the optical fibers during the fabrication of the optical interconnection apparatus. The film substrates remain in the laminate layers between which the routed optical fibers are held on both sides. The problem of a reduction in the flexibility of an optical interconnection apparatus, therefore, remains still unresolved. Further, as a material which makes up the layers having compressibility, polytetrafluoroethylene, polyethylene, polyurethane foam or the like is used. Since these materials still retain stiffness despite their thermoplastic property, a problem exists in the protection and holding of optical fibers as in the patent referred to in the above.

As has been described above, the conventional optical interconnection apparatus with optical fibers located or routed by making use of flexible substrates is provided on both sides of the two-dimensionally routed optical fibers with film substrates of "Mylar" or "Kapton". Therefore, such film substrates are arranged on both sides of the optical fiber routing layer of several hundreds micrometers to several millimeters in thickness, and are exposed as surface layers. This optical fiber routing part hence has substantially reduced flexibility, and for optical interconnections, arrangement of extended tabs is needed. As adhesive layers include only on both sides of several hundreds micrometers to several millimeters, there is a problem in the fixed placement and protection of optical fibers. The optical fibers tend to loose the intactness of their pattern, resulting in a substantial optical loss. Therefore it cannot be used as an optical interconnection apparatus. When there is not much space for the arrangement of the optical interconnection apparatus upon interconnection of optical components themselves on an optical circuit pack or interconnection of optical circuit packs together, the optical interconnection apparatus cannot be used due to insufficient flexibility and bendability.

To connect and accommodate a number of optical fibers within a limited space, an optical interconnection apparatus such as an optical circuit board is an effective and indispensable part. A further increase in the number of optical fibers to be routed makes it difficult to route and accommodate all the optical fibers on one plane of a substrate because, if one attempts to route and accommodate such a greater number of optical fibers on the one plane of the substrate, the optical fibers so routed overlap one another to include more overlapped portions of the optical fibers themselves and the area of contact with a pressure-sensitive adhesive, which serves to locate the optical fibers and hold them in place, is decreased at the overlapped portions so that the routing cannot be achieved with good positional accuracy. Further, the routing and accommodation of a greater number of optical fibers on a single plane leads to an increase in the density of end portions which are arranged at their opposite ends for permitting optical interconnections, and hence, a problem arises in that a space required to plug into connectors and the like cannot be retained physically. To resolve these problems, stacking of substrates each of which carries optical fibers routed thereon is effective. This stacking, however involves a problem that flexibility is lost. It is accordingly the current circumstance that a multilayered optical circuit board equipped with flexibility required as an optical circuit board is still unavailable. JP 10-68853 referred to in the above discloses an example in which optical fibers are routed on both sides of a laminate which is provided with a layer having compressibility. However, this layer is arranged to reduce pressures which may be applied to the optical fibers, and is not intended to permit routing and accommodation of a greater number of optical fibers.

The present invention has been completed with a view to resolving various problems of the conventional art such as those described above. Described specifically, an object of the present invention is to provide an optical interconnection apparatus which makes it possible to readily interconnect optical units such as optical components, optical circuit packs and optical circuit devices and which is provided with at least one protective resin layer having high flexibility and/or good flexibility and enabling routing and accommodation of a number of optical fibers to keep the fixed and protected optical fibers unstressed, and also a fabrication process for the optical interconnection apparatus. Another object of the present invention is to provide a novel optical interconnection apparatus which permits ready optical interconnections to optical fibers routed in an overlapped fashion as described. A further object of the present invention is to provide a process for the fabrication of an optical interconnection apparatus, which makes it possible to economically form with a good yield at least one protective resin layer, which serves to hold routed optical fibers in place and protect them from external forces (pulling, bending, scratching, and the like), without losing the intactness of the routing pattern of the located optical fibers.

DISCLOSURE OF THE INVENTION

An optical interconnection apparatus according to a first embodiment of the present invention has a single substrate, and is characterized in that it comprises a substrate having a two-dimensional plane, a protective resin layer arranged on at least one side of the substrate and having flexibility, and plural optical fibers routed on the at least one side of the substrate and provided at opposite ends thereof with end portions adapted to permit optical interconnections thereto, and the routed optical fibers are held in place by the protective resin layer.

An optical interconnection apparatus according to a second embodiment of the present invention has two or more substrates, and is characterized in that the optical interconnection apparatus comprises at least two base films having two-dimensional planes, protective resin layers having flexibility and arranged on the respective base films and between base films, respectively, plural optical fibers routed on at least one sides of the respective base films and provided at opposite ends thereof with end portions adapted to permit optical interconnections thereto, the routed optical fibers are held in place by associated ones of the protective resin layers, respectively, and the respective base films are sandwiched by the protective resin layers, whereby a stacked structure is formed. As a preferred example of the optical interconnection apparatus according to the second embodiment, there is an optical interconnection apparatus comprising at least two base films having two-dimensional planes, protective resin layers having flexibility and arranged on the respective base films and between the base films, respectively, plural optical fibers routed on at least one sides of the respective base films and provided at opposite ends thereof with end portions adapted to permit optical interconnections thereto, said routed optical fibers being held in place by associated ones of the protective resin layers, respectively, and said respective base films being sandwiched by the protective resin layers, whereby a stacked structure is formed.

An optical interconnection apparatus according to a third embodiment of the present invention does not have a substrate, and is characterized in that it comprises plural optical fibers routed in a two-dimensional plane and provided at ends thereof with end portions adapted to permit optical interconnections and one or plural protective resin layers having flexibility, and the optical fibers are held in place in a form embedded in at least one of the protective resin layers. As a preferred example of the optical interconnection apparatus according to the third embodiment, there is an optical interconnection apparatus comprising plural optical fibers routed in a two-dimensional plane and provided at ends thereof with end portions adapted to permit optical interconnections and two or more protective resin layers stacked one over the other via an adhesive layer and having flexibility, said optical fibers being held in place in a form embedded in at least one of the two or more protective resin layers.

In the present invention, the optical interconnection apparatus of the first embodiment having a single substrate can be fabricated by routing plural optical fibers on one of sides of a substrate having a two-dimensional plane, for example, a flexible base film such that the optical fibers are provided at opposite ends thereof with end portions to be adapted to permit optical interconnections, and then forming a protective resin layer having flexibility such that the optical fibers so routed are held in place. Concerning the optical interconnection apparatus according to the first embodiment, a second protective resin layer having flexibility and made of the same or different resin material as or from that of the first protective resin layer may also be formed after the first protective resin layer is formed as described above. As an alternative, an optical interconnection apparatus can also be fabricated by routing, subsequent to the formation of the first protective resin layer as described above, plural optical fibers on the other side of the base film such that the optical fibers are provided at opposite ends thereof with end portions to be adapted to permit optical interconnections, and then forming a second protective resin layer, which has flexibility and is made of the same or different resin material as or from that of the first protective resin layer, such that the optical fibers so routed are held in place.

In the present invention, an optical interconnection apparatus having two or more base films can be fabricated by a process which comprises stacking a flexible base film having a two-dimensional plane by adhesion or the like over one of protective resin layers of an optical interconnection apparatus fabricated as described above, routing plural optical fibers on the base film such that the optical fibers are provided at opposite ends thereof with end portions to be adapted to permit optical interconnections, and then forming a third protective resin layer having flexibility such that the optical fibers so routed are held in place, whereby a stacked structure is fabricated. An optical interconnection apparatus which includes many base films with optical fibers routed thereon can be fabricated by repeating the step, in which the third protective resin layer is formed, to form a stacked structure of the plural base films and the plural protective resin layers with the corresponding optical fibers held in place therein.

In addition, an optical interconnection apparatus which includes plural base films can also be fabricated by adhering together protective resin layers of optical interconnection apparatus, each of which has been fabricated as described above and includes a single base film, such that a stacked structure is formed.

Upon fabrication of the optical interconnection apparatus according to the first or second embodiments of the present invention, it is preferable to form the protective resin layer by arranging an edge-dam member along or in a vicinity of a peripheral edge of the base film, filling a resin material inside the edge-dam member to form a protective resin layer, and then solidifying the resin material.

In the present invention, a first process for the fabrication of the film-less optical interconnection apparatus of the third embodiment is characterized in that the process comprises providing a stacked structure, which comprises a protective resin layer having flexibility and an adhesive layer, routing plural optical fibers on the adhesive layer such that the optical fibers are provided at opposite ends thereof with end portions to be adapted to permit optical interconnections, and then forming on the optical fibers another protective resin layer, which has flexibility and is made of the same or different resin material as that of the protective resin layer, to hold the optical fibers in place. The stacked structure may be fabricated by forming an adhesive layer on a protective resin layer, which has flexibility and has been obtained by forming the protective resin layer over a release film having a two-dimensional plane and then removing the film.

Further, a second process for the fabrication of the film-less optical interconnection apparatus of the third embodiment is characterized in that the process comprises providing as a temporary base film an adhesive base film having a two-dimensional release plane on which an adhesive layer is located, routing plural optical fibers on the adhesive layer such that the optical fibers are provided at opposite ends thereof with end portions to be adapted to permit optical interconnections, forming a first protective resin layer having flexibility on the routed optical fibers to hold the optical fibers in place, removing the release film on a back side, and then forming over the thus-exposed adhesive layer a second protective resin layer having flexibility and made of the same or different resin material as that of the protective resin layer.

In the second fabrication process, the optical interconnection apparatus can also be fabricated by forming a first protective resin layer to hold the optical fibers in place, removing the release film on a back side, routing on the thus-exposed adhesive layer other plural optical fibers such that the optical fibers are provided at opposite ends thereof with end portions to be adapted to permit optical interconnections, and then forming on the routed optical fibers a second protective resin layer having flexibility and made of the same or different resin material as that of the first protective resin layer to hold the optical fibers in place.

In the fabrication of the optical interconnection apparatus according to the third embodiment, the protective resin layer or the other protective resin layer can be formed by arranging an edge-dam member along or in a vicinity of a peripheral edge of the protective resin layer or the release film having the two-dimensional plane, filling a resin material inside the edge-dam member, and then solidifying the fixing resin layer.

BEST MODES FOR CARRYING OUT THE INVENTION

Figure 1:
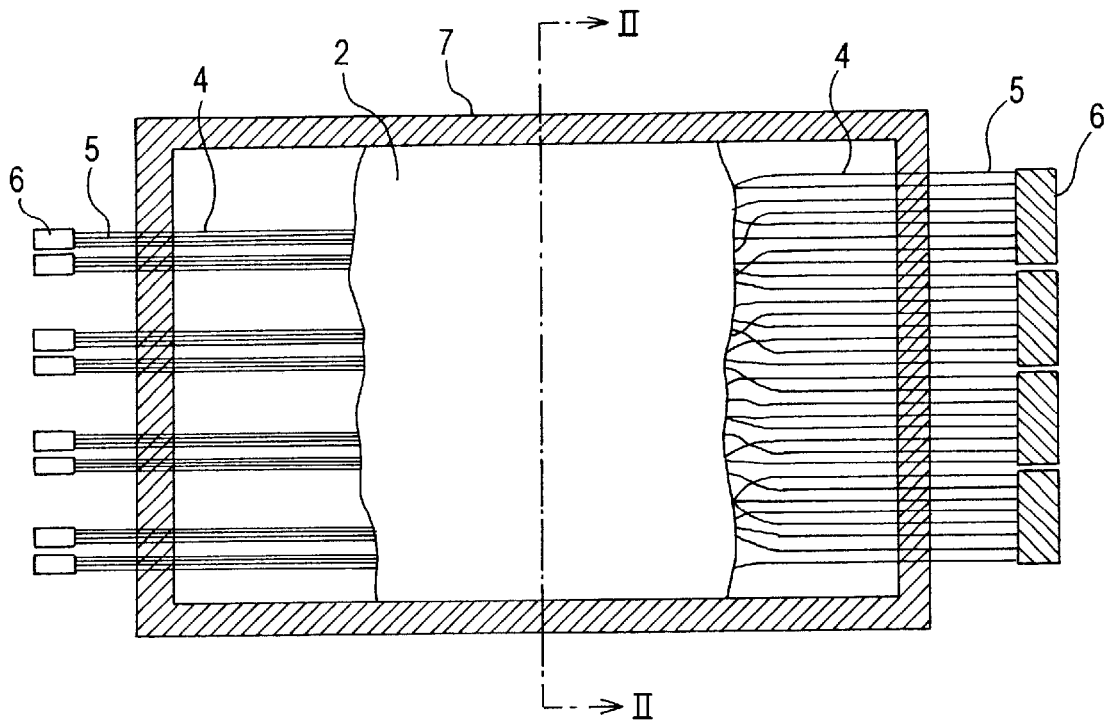
FIG. 1 is a partly cut-away top plan view of an illustrative optical interconnection apparatus according to the present invention.

Referring to the drawings, embodiments of the present invention will hereinafter be described in detail.

Figure 2:
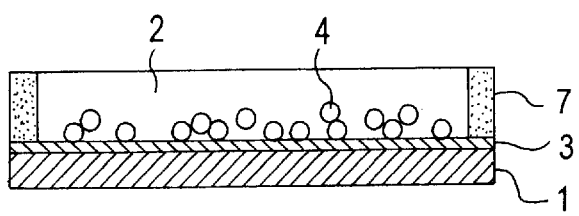
FIG. 2 is a cross-sectional view of the optical interconnection apparatus taken in the direction of arrows II—II of FIG. 1.
Figure 3:
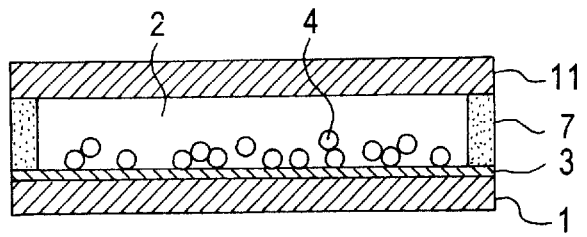
FIG. 3 is another cross-sectional view of the optical interconnection apparatus according to the present invention.

FIG. 1 is a partly cut-away top plan view of an illustrative optical interconnection apparatus according to a first embodiment of the present invention, and FIG. 2 and FIG. 3 are its cross-sectional views. In the drawings, plural optical fibers 4 are routed via an adhesive layer 3 on a base film 1 which has a two-dimensional plane. Opposite ends of the optical fibers are formed into end portions 5 adapted to permit optical interconnections. Optical components 6, for example, optical connectors are interconnected to the end portions. An edge-dam 7 is arranged on and along peripheral edge portions of the base film 1. Arranged inside the edge-dam is a protective resin layer 2 which has been formed by filling a resin material. In FIG. 3, another protective layer 11 is arranged further over the protective resin layer of FIG. 2.

Figure 4:
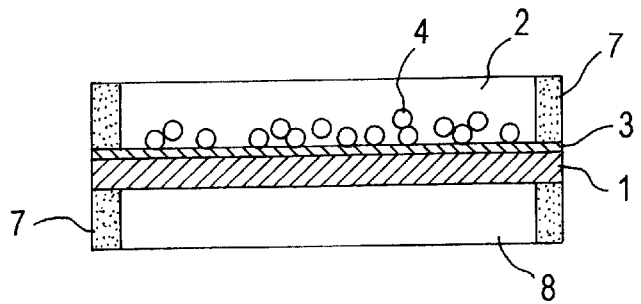
FIG. 4 and FIG. 5 are cross-sectional views of optical interconnection apparatus according to the present invention, each of which is provided with a single base film.
Figure 5:
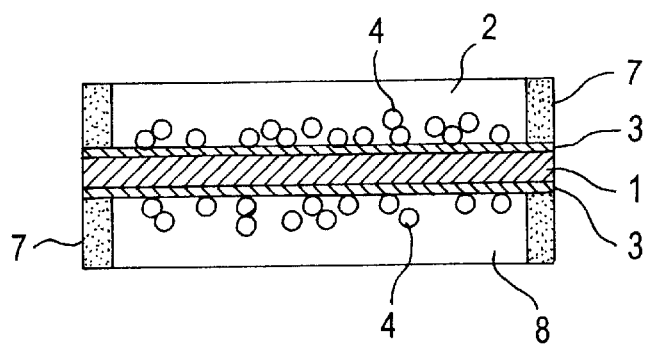

FIG. 4 and FIG. 5 illustrate other examples of the optical interconnection apparatus according to the first embodiment of the present invention, each of which is provided with a single base film. In FIG. 4, plural optical fibers 4 are routed via an adhesive layer 3 on one side of a base film 1 which has a two-dimensional plane, and these optical fibers 4 are held in place by a first protective resin layer 2 having flexibility. Arranged on the other side of the base film 1 is a second protective resin layer 8 having flexibility and made of the same or different material as or from the resin material of the first protective resin layer 2. Opposite ends of the optical fibers 4 are formed into end portions 5 adapted to permit interconnections. Optical components 6, for example, optical connectors are interconnected to the end portions. Incidentally, the end portions 5 and their corresponding optical components 6 may be integrated together. Designated at numeral 7 are edge-dams arranged for the formation of protective resin layers.

In FIG. 5, plural optical fibers 4 are routed on both sides of a base film 1 via adhesive layers 3, and are held in place by a first protective resin layer 2 and second protective resin layer 8 having flexibility, respectively.

Figure 6:
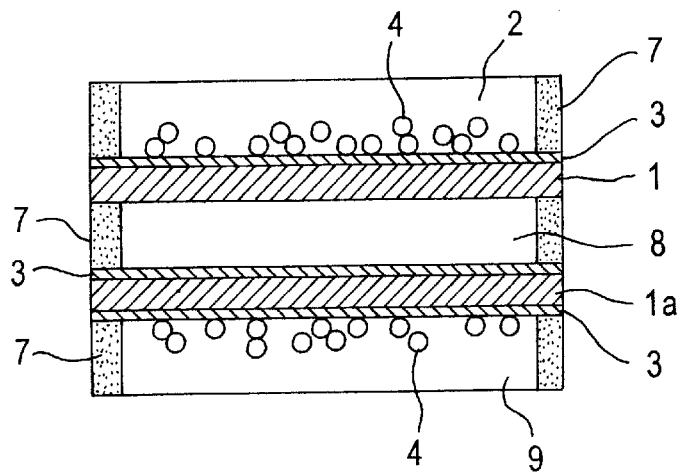
FIG. 6 through FIG. 9 are cross-sectional views of optical interconnection apparatus according to the present invention, each of which is provided with plural base films.
Figure 7:
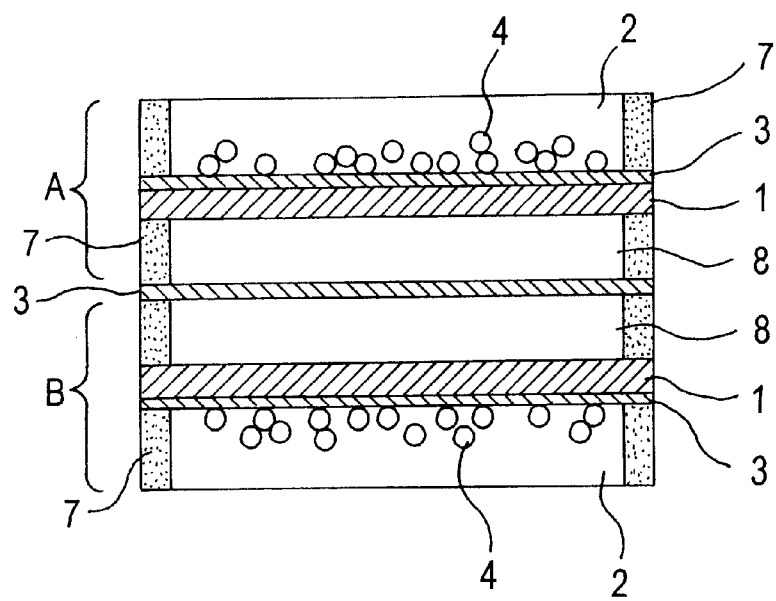
Figure 8:
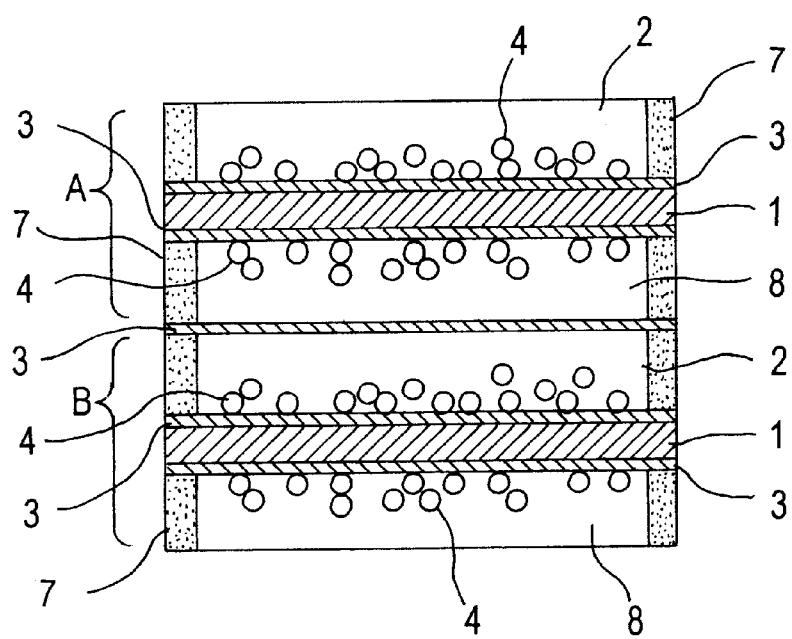

FIG. 6 through FIG. 9 illustrate examples of an optical interconnection apparatus according to the second embodiment of the present invention, each of which includes plural base films. In FIG. 6, on a surface of the second protective resin layer 8 of the optical interconnection apparatus shown in FIG. 4, a second base film 1a is stacked via another adhesive layer 3, and on the second base film, plural optical fibers are routed via another adhesive layer 3 and are held in place by a third protective resin layer 9 having flexibility. In FIG. 7, two optical interconnection apparatus A,B of the construction shown in FIG. 4 are stacked one over the other into a stacked structure, in which second protective resin layers 8,8 of the respective optical interconnection apparatus are adhered together via an adhesive layer 3. In FIG. 8, two optical interconnection apparatus A,B of the construction depicted in FIG. 5 are stacked one over the other into a stacked structure, in which a first protective resin layer 2 of one of the optical interconnection apparatus and a second protective resin layer 8 of the other optical interconnection apparatus are adhered together via an adhesive layer 3.

Figure 9:
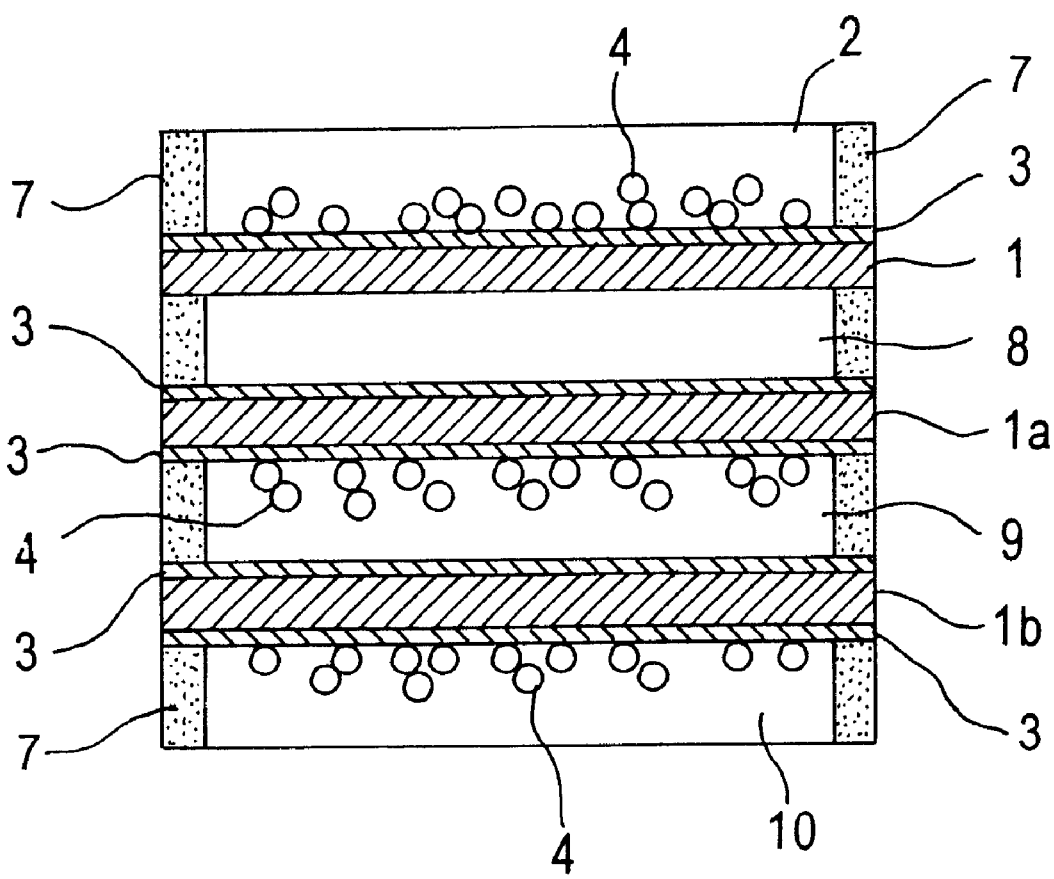

FIG. 9 illustrates an optical interconnection apparatus which includes three base films. On a surface of the third protective resin layer 9 of the optical interconnection apparatus of FIG. 6, a third base film 1b is stacked via another adhesive layer 3. On the third base film, plural optical fibers 4 are routed via a still further adhesive layer 3 and are held in place by a fourth protective resin layer 10 having flexibility.

Figure 10:
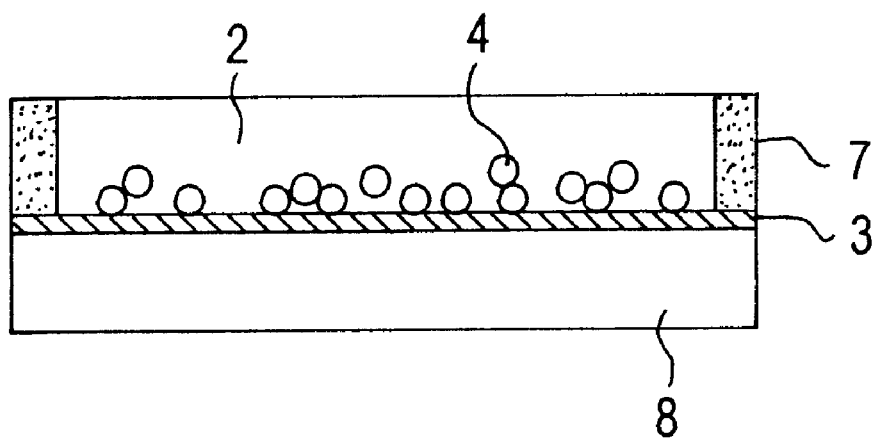
FIG. 10 through FIG. 14 are cross-sectional views of optical interconnection apparatus according to the present invention, each of which is not provided with any base film; wherein FIG. 11 and FIG. 12 also illustrate the fabrication process according to the present invention.
Figure 11:
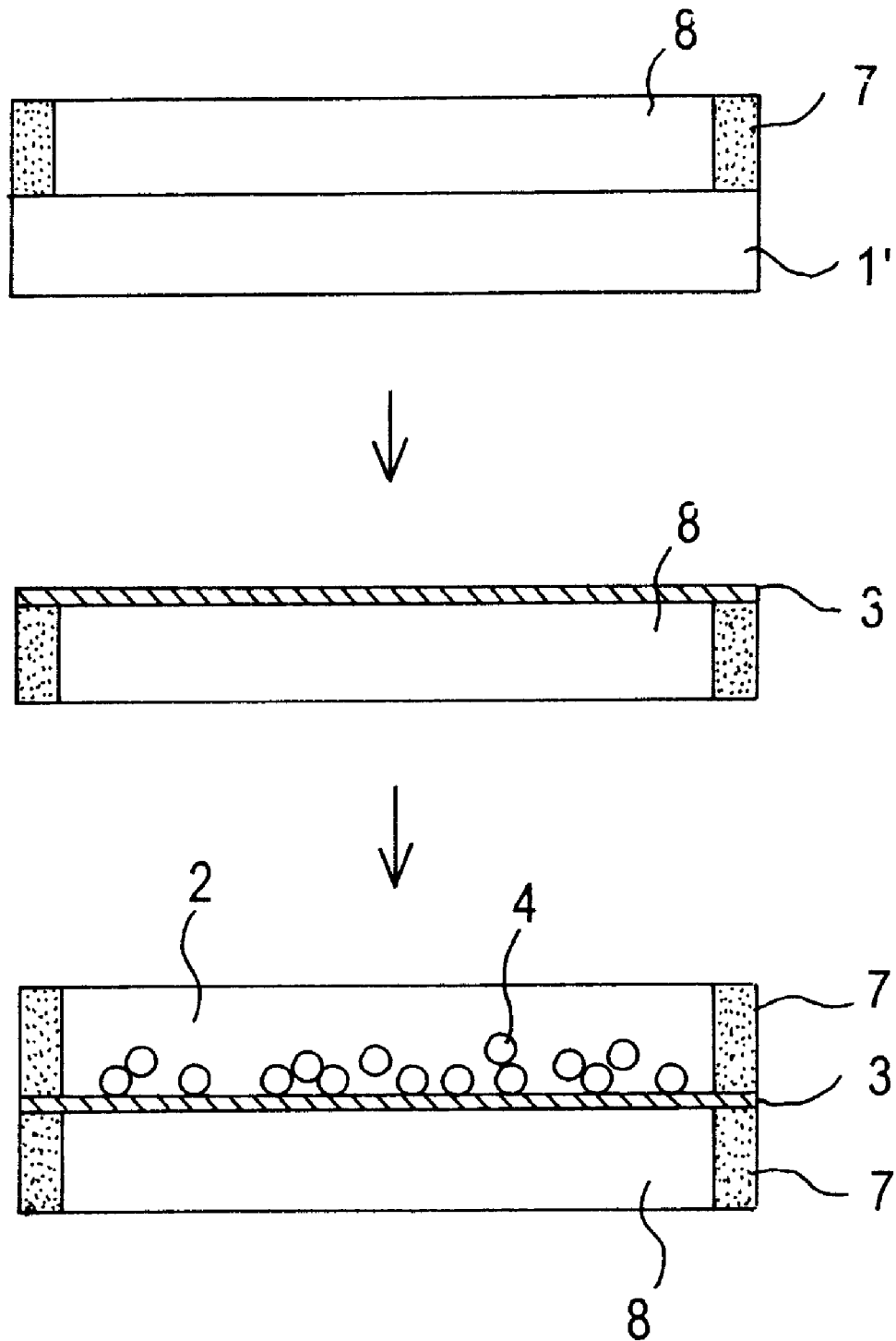
Figure 12:
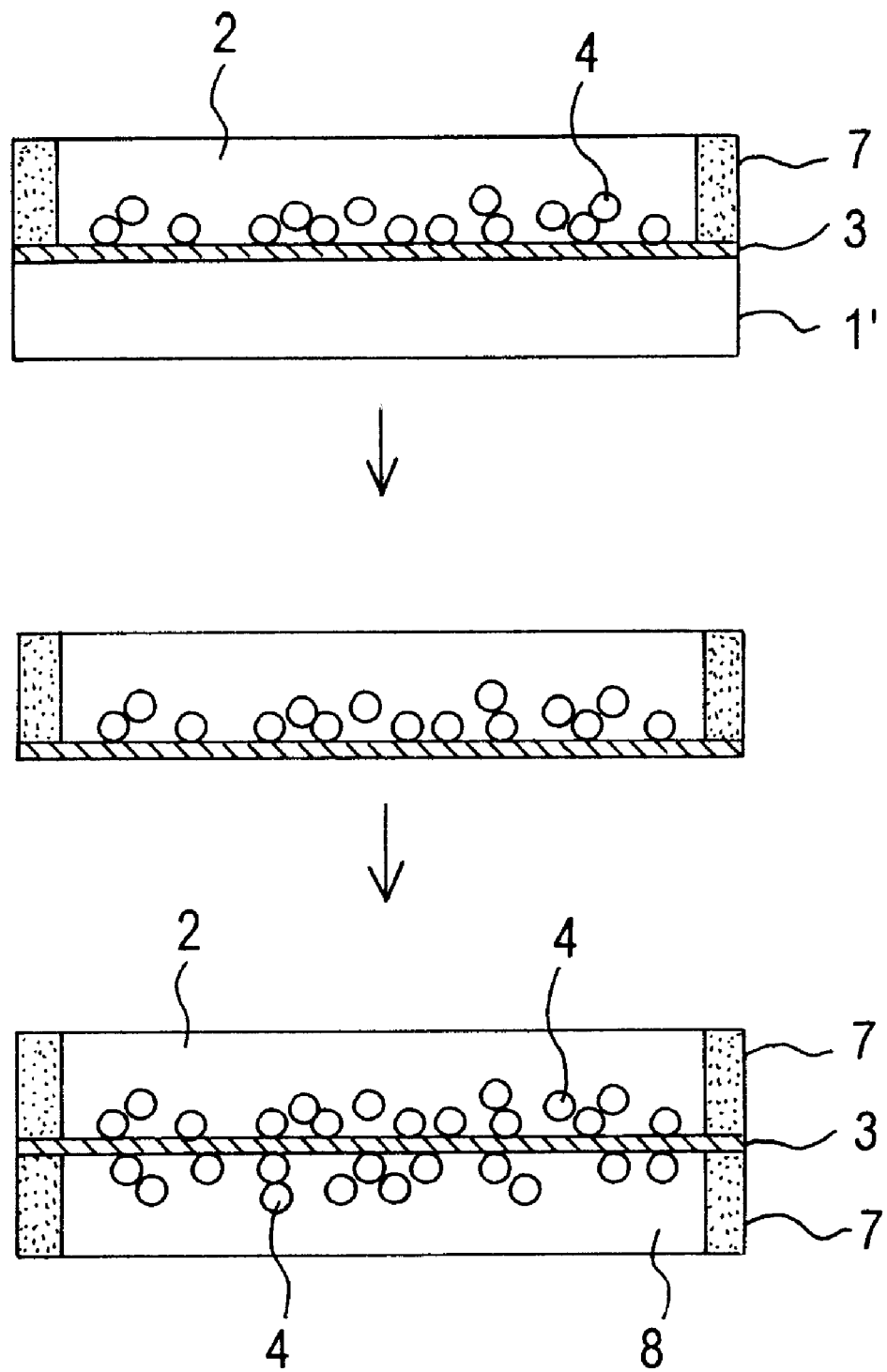

FIG. 10 through FIG. 14 depict examples of an optical interconnection apparatus according to the third embodiment of the present invention, each of which does not include any base film. FIG. 10 shows the illustrative optical interconnection apparatus fabricated by a first fabrication process, while FIG. 11 and FIG. 12 show the illustrative optical interconnection apparatus fabricated by a second fabrication process.

In FIG. 10, on one side of a protective resin layer 8 having flexibility and provided in advance, plural optical fibers 4 are routed via an adhesive layer 3, and these optical fibers 4 are held in place by another protective resin layer 2 made of the same or different material as or from that of the above-described protective resin layer 8.

FIG. 11 depicts the illustrative optical interconnection apparatus fabricated by using a temporary base film which is composed of a release film 1' and an adhesive layer 3 arranged on one side of the release film 1'. Described specifically, plural optical fibers 4 are routed on the release film 1' via the adhesive layer 3, and these plural optical fibers are held in place by a first protective resin layer2. Then, the release film 1' is removed, and on the exposed adhesive layer 3, a second protective resin layer 8 having flexibility and made of the same or different material as or from that of the first protective resin layer 2 is arranged.

In FIG. 12, plural optical fibers are routed via the adhesive layer 3 exposed by removing the release film 1' in FIG. 11. These optical fibers 4 are held in place by a second protective resin layer 8 having flexibility and made of the same or different material as or from that of the first protective resin layer 2.

Figure 13:
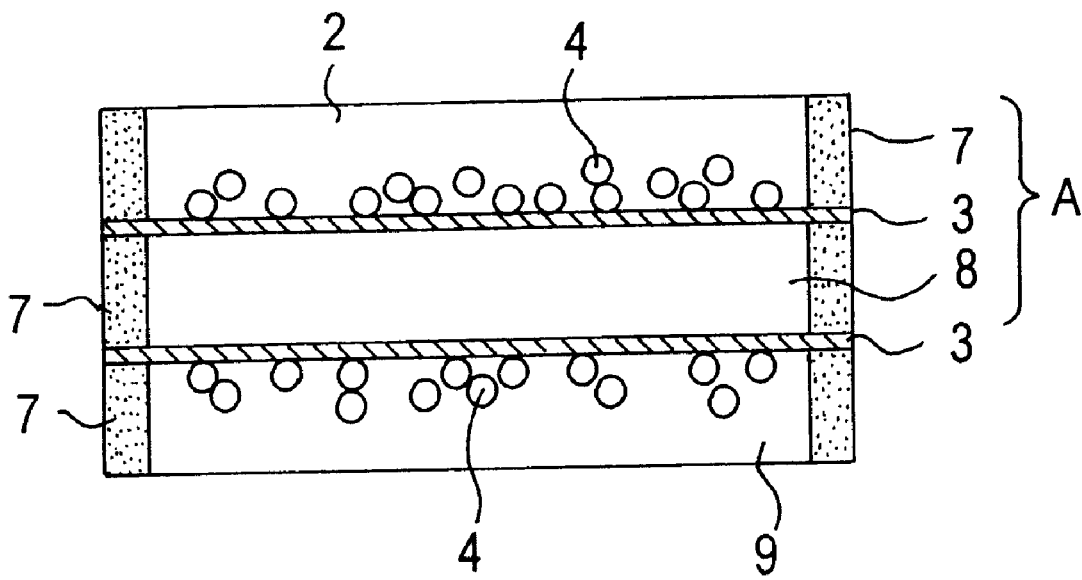

In FIG. 13, on a surface of the second protective resin layer 8 of the optical interconnection apparatus A shown in FIG. 11, another adhesive layer 3 is arranged and plural optical fibers 4 are routed via the adhesive layer 3. These optical fibers 4 are held in place by a third protective resin layer 9 having flexibility and made of the same or different material as or from that of the first and second protective resin layers 2, 8.

Figure 14:
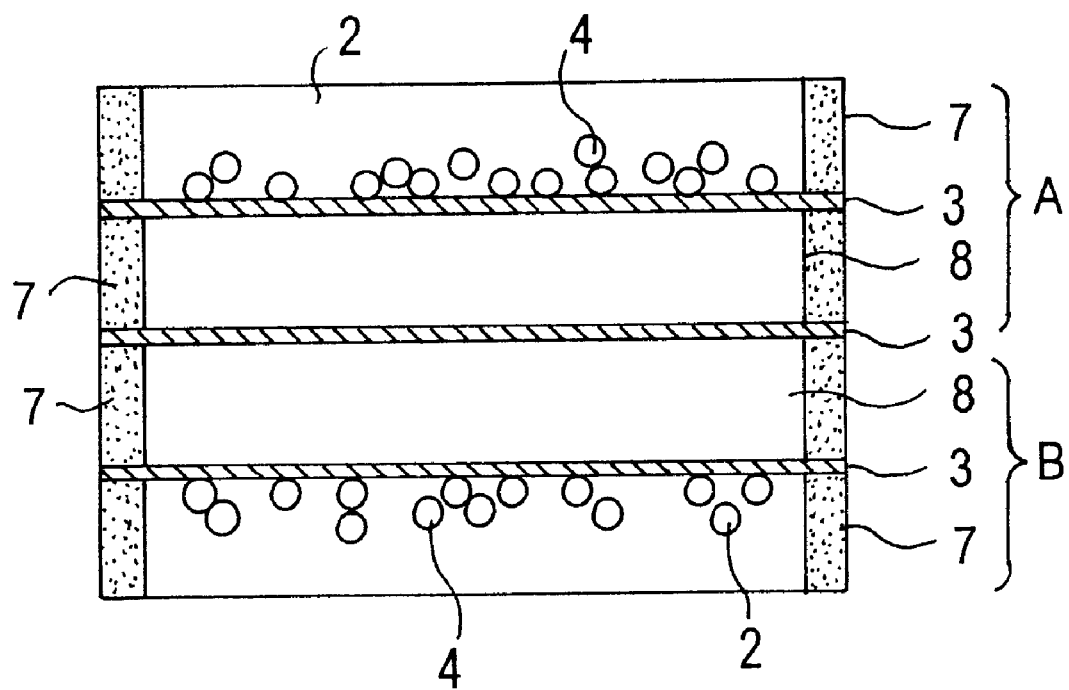

FIG. 14 shows the illustrative optical interconnection apparatus in which two optical interconnection apparatus A,B of the construction depicted in FIG. 11 are stacked one over the other into a stacked structure, and their second protective resin layers 8, 8 are adhered together via a still further adhesive layer 3.

In each optical interconnection apparatus according to the present invention, no particular limitation is imposed on the one or more base films each of which has a two-dimensional plane and supports the routed optical fibers thereon. Illustrative of the base film or substrates can include those having a certain degree of flexibility such as glass-epoxy resin composite substrates, polyester films, polyimide films, and silicone or urethane rubber or foam. Any base film or films are usable insofar as it or they are employed in general electronic parts or electrical parts. Further, the base film or substrates may be of any shape. In the present invention, flexible base films are employed preferably. It is to be noted that depending on the application purpose, the optical interconnection apparatus according to the present invention is not required to be flexible but may be stiff, thereby making it possible to use a stiff polymer substrate, a ceramic substrate or the like. It is also to be noted that the optical interconnection apparatus according to the third embodiment of the present invention can also be used in a form stacked on a stiff substrate or the like.

Optical fibers, which are to be routed in the present invention, can be suitably selected and used depending on the application purpose of the optical interconnection apparatus. For example, silica- or plastic-made single-mode optical fibers, multiple-mode optical fibers or the like can be used preferably. As major factors which generally govern the service life of optical fibers, intrusion of water and hydrogen from the surrounding atmosphere can be mentioned. Carbon-coated optical fibers can minimize intrusion of water and hydrogen so that they can provide high reliability and long service life. Different from general optical cables, the optical interconnection apparatus according to the present invention is not provided with a cable sheath which provides high environmental resistance. It is therefore more effective to use carbon-coated optical fibers for their high reliability.

As a routing method for optical fibers in the present invention, it is most convenient to route them by arranging an adhesive layer on a base film. Nonetheless, a suitable method may be selected for the routing of optical fibers depending on the application purpose. It is only necessary to route optical fibers such that they are provided at both ends thereof with end portions adapted to permit interconnections. For example, it is possible to arrange optical fibers by arranging projecting members, recessed members or the like on a base film or by providing outer surfaces of the optical fibers with adhesive layers.

As an adhesive for forming adhesive layers to route optical fibers, any adhesive can be used insofar as it has adhesiveness sufficient to retain the pattern of the optical fibers in response to tensions which may be produced when the routed optical fibers are bent. Usable examples can include various pressure-sensitive adhesives (adhesives), thermoplastic adhesives and thermosetting adhesives, such as urethane-base adhesives, acrylic adhesives, epoxy adhesives, nylon-base adhesives, phenol-base adhesives, polyimide-base adhesives, vinyl adhesives, silicone-base adhesives, rubber-base adhesives, fluorinated epoxy adhesives and fluorinated acrylic adhesives. From the standpoint of readiness in routing optical fibers, pressure-sensitive adhesives and thermoplastic adhesives are used preferably.

No particular limitation is imposed on the resin which makes up the one or more protective resin layers having flexibility in each optical interconnection apparatus according to the present invention, and gel-like or rubber-like organic materials, those classified as curable resins, such as ultraviolet-curing resins, electron beam curing resins and thermosetting resins, and having flexibility, thermoplastic resin having flexibility and the like can be used. More specifically, silicone gels, acrylic resin gels, fluorinated resin gels and the like can be mentioned as gel-like organic materials, and as rubber-like organic materials, silicone rubbers, urethane rubbers, fluorinated rubbers, acrylic rubbers, ethylene-acrylic rubbers, SBR, BR, NBR, chloroprene rubbers and the like can be mentioned. As curable resins having flexibility, epoxy resins, ultraviolet-curing resins, silicone resins and the like can be mentioned. As thermoplastic resins having flexibility, resins making up hot-melt adhesives, for example, polyvinyl acetate, acrylic resins such as polyethyl methacrylate, polyvinylidene chloride resin, polyvinyl butyral resins and polyamide resins can be mentioned.

Over a protective resin layer as a surface of an optical interconnection apparatus, a further protective layer may be arranged as needed. As described above, where the optical interconnection apparatus is not highly required to be flexible by itself, the further protective layer can be the same one as the above-described base films on which optical fibers are routed, and a sheet or plate made of an organic high molecular material, ceramic or the like can be used. Where an optical interconnection apparatus is required to be flexible, on the other hand, a hard-coated silicone-based material or the like can be used as an illustrative protective layer not impairing the flexibility of the optical interconnection apparatus.

In each optical interconnection apparatus according to the present invention, the optical fibers extend out from desired positions (ports) on opposite end faces of the optical interconnection apparatus so that end portions are formed. Optical connectors are attached on the end portions, or the end portions are arc-fusion-spliced with optical fibers interconnected to optical connectors. No particular limitation is imposed on the optical connectors interconnected to the optical interconnection apparatus according to the present invention, but optical single-fiber or multiple-fiber small connectors can be chosen suitably. Examples can include MOP optical connectors, MT optical connectors, MU optical connectors, FPC optical connectors [NTT R&D, 45, 6 589], and V-grooved parts useful for optical interconnections. No particular limitation is imposed on the interconnection method of optical connectors, and the end portions and their corresponding optical connectors may be integrated together.

In the present invention, the optical interconnection apparatus according to the first embodiment equipped with the single base film is fabricated as will be described next. For example, optical fibers are firstly routed in a desired pattern by the above-described adhesive on one side of a flexible base film having a two-dimensional plane. At this time, the opposite ends of the optical fibers are located extending out from the base film such that they can be adapted as end portions for permitting optical interconnections with optical connectors or the like. As a process for arranging the adhesive layer, it is possible to adopt a process, in which the adhesive layer is arranged by coating an adhesive, either as is or in the form of a coating material dissolved in a solvent, on the base film by a method such as roll coating, bar coating, blade coating, casting, dispenser coating, spray coating or screen coating, or another process in which an adhesive sheet with the adhesive layer formed in advance on a release film is laminated on the base film and the release film is then removed. For the adhesive layer, a suitable thickness can be chosen and used depending on the diameter of optical fibers to be routed. Its thickness is set generally in a range of from 1 am to 1 mm, preferably from 5 to 500 $\mu$m, more preferably from 10 to 300 $\mu$m.

On the optical fibers routed as described above, a protective resin layer is formed by using a resin material for the formation of protective resin layers having flexibility, whereby an optical interconnection apparatus is fabricated. Especially when flexibility is required in the present invention, it is preferred to form a second protective resin layer having flexibility with a resin material, which is the same as or different from that of the above-described protective resin layer, on the other side of the base film in the optical interconnection apparatus fabricated as described above. As an alternative, subsequent to formation of a first protective resin layer as described above, plural optical fibers may be routed on the other side of the base film such that the optical fibers are provided at opposite ends thereof with end portions adapted to permit optical interconnections, and a second protective resin layer having flexibility may then be formed with a resin material, which is the same as or different from that of the above-described protective resin layer, such that the routed optical fibers are held in place in an embedded form.

Depending on the diameter of the routed optical fibers and the overlapped number of the routed optical fibers, a suitable thickness may be chosen for the protective resin layer with the optical fibers routed therein so that the optical fibers can be protected and held in place. In general, a thickness of (the diameter of optical fibers)×(the number of overlapped fibers) or greater is needed. For the protective resin layer without any optical fibers routed therein, on the other hand, a thickness of such an extent as reducing the stiffness of the base film may be chosen suitably depending on the application purpose of the optical interconnection apparatus. In general, the thickness is set within a range of from about 1 $\mu$m to several centimeters, preferably of 10 $\mu$m to 10 mm, more preferably of 30 $\mu$m to 1 mm.

Figure 15A:
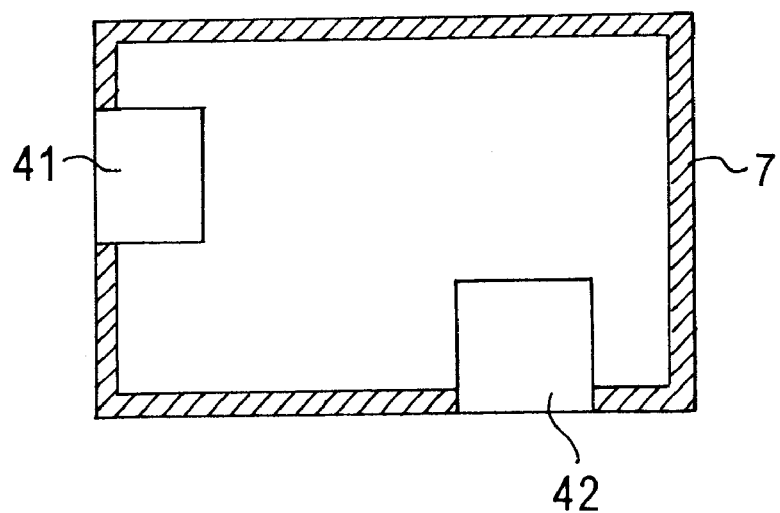
FIG. 15(a) and 15(b) are schematic illustrations for describing the shapes of edge-dams when optical components are mounted on base films. In these drawings, the respective signs designate the following elements: 1,1a,1b: substrates or base films, 2: protective resin layer, 3: adhesive layer, 4: optical fibers, 5: end portions, 6: optical components such as optical connectors or optical modules, 7,7a,7b: edge-dams, 8: second protective resin layer, 9: third protective resin layer, 10: fourth protective resin layer, 11: protective layer, 41: optical component, 42: optical component, A: optical interconnection apparatus, B: optical interconnection apparatus.
Figure 15B:
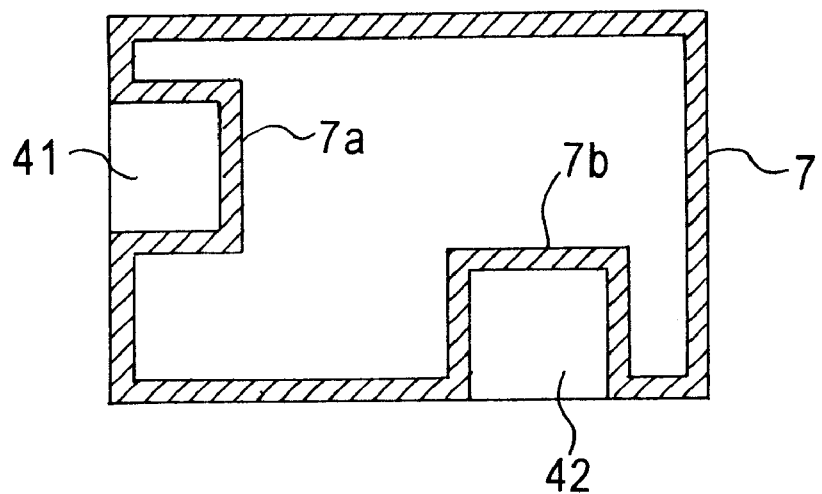

As a simplest process for the arrangement of the protective resin layer on the base film, it can be formed by arranging an edge-dam along or in the vicinity of the peripheral edges of the base film, filling a resin material inside the thus-formed edge-dam and then solidifying it there. The protective resin layer can be formed, for example, by a process in which the resin material is formed into a coating material by dissolving it in a suitable solvent and the coating material is then added dropwise and dried, a process in which a thermosetting resin in a liquid form is added dropwise and is hardened under heat, a process in which a moisture-curing resin or anaerobically curable resin in a liquid form is added dropwise and is then cured by applying moisture at room temperature or shutting off a gas, a process in which a thermoplastic resin molten by heating is added dropwise and is then solidified by cooling, a process in which a resin in a solid form is filled inside the edge-dam, is caused to melt under heat, and is solidified.

Where optical components such as optical connectors, optical modulators, optical devices or the like are mounted in the vicinity of the peripheral edge of the base film, these optical components may be able to play the role of an edge-dam. In such a case, it is no longer necessary to arrange an edge-dam at the areas where the optical components are mounted. FIG. 15(a) illustrates this case, in which optical components 41,42 mounted in the vicinity of the corresponding peripheral edges of the base film serve as substitutes for the edge-dam 7. To keep these optical components and the protective resin layer out of contact with each other, the edge-dam may be arranged avoiding these optical components, i.e., around them in the present invention. FIG. 15(b) shows this case, in which edge-dams 7a, 7b are arranged around the optical components 41,42. Arrangement of edge-dams as described above makes it possible to prevent a resin material from flowing out of the edge-dams or to prevent damages of the optical components upon formation of a protective resin layer.

It is generally sufficient if the edge-dam is arranged along or in the vicinity of the peripheral edges of a substrate or a base film.

The material for forming the edge-dam is not limited to any specific one, and preferably, can be selected suitably depending on the application purpose of the optical interconnection apparatus. In particular, a nonwoven fabric made of organic fibers such as polyethylene, polypropylene or nylon fibers, a nonwoven fabric of glass fibers, or a sealing compound (filler) of a silicone-base, epoxy-base, urethane-base or acrylic resin can be used suitably. No limitation is imposed on the size and shape of the edge-dam insofar as it can prevent the resin material, which is to be filled inside the edge-dam, from flowing out.

In the present invention, the optical interconnection apparatus according to the second embodiment equipped with two base films can be fabricated as will be described next. Namely, an adhesive layer is arranged, for example, on one of the protective resin layers which exist on both sides of the base film in the optical interconnection apparatus fabricated as described above. After the second base film is adhered, another adhesive layer is arranged on the exposed surface of the second base film, and optical fibers are routed in a desired pattern on the last-mentioned adhesive layer. Using a resin material which is the same as or different from the resin material employed for the first or second protective resin layer, a third protective resin layer having flexibility is then formed such that the routed optical fibers are held in place. As a result, a stacked structure composed of the two base films and the three protective resin layers can be formed. By repeating a step of forming the third protective resin layer, an optical interconnection apparatus which includes many base films with optical fibers routed thereon can be fabricated. Described specifically, a stacked structure, which is composed of plural base films and plural protective resin layers with optical fibers held in place, can be formed by repeating steps which comprise stacking a base film having a two-dimensional plane on the third protective resin layer, routing plural optical fibers on the base film such that the optical fibers are provided at opposite ends thereof with end portions adapted to permit optical interconnections, and then forming a protective resin layer having flexibility such that the routed optical fibers are held in place.

It is also possible to use base films each of which is beforehand provided on both sides thereof with adhesive layers, respectively. An optical interconnection apparatus having optical fiber layers, which have a multi-layered structure and are adapted to permit optical interconnections, can also be fabricated by adhereing each of the substrates to protective resin layers.

A stacked structure can also be formed by fabricating plural optical interconnection apparatus, each of which is in the form that a base film is sandwiched by protective resin layers having flexibility, in advance by the above-described process and then adhereing the protective resin layers of the plural optical interconnection apparatus together. It is also possible to fabricate an optical interconnection apparatus, which includes optical fiber layers having a multi-layered structure and adapted to permit optical interconnections, by arranging an adhesive layer, for example, directly arranging an adhesive layer on a surface of a protective resin layer of one of the optical interconnection apparatus or transferring an adhesive layer onto the surface of the protective resin layer from an adhesive sheet on which the adhesive layer has been arranged in advance, and then mounting and adhereing another one of the optical interconnection apparatus on and to the adhesive layer. By repeating the above-described procedures, an optical interconnection apparatus composed of a stacked structure having a greater multi-layered structure can also be fabricated.

In the first process for the fabrication of the optical interconnection apparatus according to the third embodiment of the present invention, said optical interconnection apparatus having no base film, a protective resin layer having flexibility is first formed by providing as a temporary substrate a release film having a two-dimensional plane, forming the protective resin layer having flexibility on the film, and then removing the release film. Described specifically, a material which is usable for forming the protective resin layer having flexibility is coated, directly when the material is in a liquid form or in the form of a liquid obtained by heating the material or of a coating material obtained by dissolving the material in a solvent when the material is solid, onto a release film, for example, a silicone-base film, a TEFLON-base film, a polyethylene terephthalate film or the like by a method such as roll coating, bar coating, blade coating, casting, dispenser coating or spray coating, followed by drying or curing. Thereafter, the release film is removed. Examples of the support, which is usable as the temporary substrate and the release film having the two-dimensional plane, can include plastic films, plastic plates, and metal sheets.

An adhesive layer is then formed on the thus-formed protective resin layer having flexibility, whereby a stacked structure composed of the protective resin layer and the adhesive layer is fabricated. As a process for arranging the adhesive layer, it is possible to adopt a process, in which the adhesive layer is arranged by coating an adhesive, either as is directly or in the form of coating dissolved in a solvent, on the protective resin layer by a method such as roll coating, bar coating, blade coating, casting, dispenser coating or spray coating, or a process in which an adhesive sheet with the adhesive layer formed in advance on a release film is adhered to the above-described protective resin layer and the release film is then removed. For the adhesive layer, a suitable thickness can be chosen and used depending on the diameter of optical fibers to be routed. Its thickness is set generally in a range of from 1 $\mu$m to 1 mm, preferably from 5 to 500 $\mu$m, more preferably from 10 to 300 $\mu$m.

On the adhesive layer of the stacked structure obtained as described above, optical fibers are routed in a desired pattern. Here, it is necessary to have the ends of the optical fibers located extending out such that they become end portions adapted to permit optical interconnections with optical connectors and the like.

On the stacked structure with the optical fibers so routed, a protective resin layer having flexibility is formed by using a resin material which is the same as or different from that of the protective resin layer of the above-described stacked structure, whereby the routed optical fibers are held in place and protected in a form embedded in the protective resin layer. Depending on the diameter of the routed optical fibers and the overlapped number of the routed optical fibers, a suitable thickness may be chosen for the protective resin layer so that the optical fibers can be protected and held in place. In general, a thickness of (the diameter of optical fibers)×(the number of overlapped fibers) or greater is needed.

As a simplest process for the arrangement of the protective resin layer on the stacked structure provided with the routed optical fibers, it can be formed by arranging an edge-dam along or in the vicinity of the peripheral edges of the protective resin layer in the stacked structure, filling a resin material inside the thus-formed edge-dam and then solidifying it there. Specifically, it can be formed in a similar manner as that mentioned above in connection with the optical interconnection apparatus according to the first and second embodiments each of which includes one or two base films.

In the second process for the fabrication of the optical interconnection apparatus according to the third embodiment, said optical interconnection apparatus having no base film, an adhesive base film composed of a release film having a two-dimensional plane and an adhesive layer arranged thereon is first provided as a temporary substrate, and optical fibers are then routed in a desired pattern on the adhesive layer. Here, it is necessary to have the ends of the optical fibers located extending out such that they become end portions adapted to permit optical interconnections with optical connectors and the like. A first protective resin layer having flexibility is then formed on the routed optical fibers such that the optical fibers are held in place. The formation of the protective resin layer can be effected by arranging an edge-dam in a manner as described above in connection with the first process. After that, the release film on the back side is removed, and a second protective layer having flexibility and made of a resin material, which is the same as or different from that of the first protective resin layer, is formed on the exposed adhesive layer. The formation of this second protective resin layer can also be conducted most conveniently by arranging an edge-dam. It can also be effected by conducting coating in accordance with a coating method such as dispenser or spray coating.

In the above-described second fabrication process, the release film on the back side may be removed after holding the first optical fibers in place by forming the first protective resin layer, other plural optical fibers may be routed on the exposed adhesive layer such that the optical fibers are provided at both ends thereof with end portions adapted to permit optical interconnections, and the second protective resin layer having flexibility and made of a resin material, which is the same as or different from the first protective resin layer, may then be formed on the routed optical fibers. As a result, an optical interconnection apparatus in which the sets of optical fibers are held in place by the two protective resin layers, respectively, can be fabricated as shown in FIG. 12.

Similarly to the case of the optical interconnection apparatus according to the second embodiment, said optical interconnection apparatus including two base films, a stacked structure having three protective layers with optical fibers held in place therein can be formed by forming an adhesive layer on the protective resin layer of the optical interconnection apparatus according to the third embodiment fabricated as described above, routing optical fibers in a desired pattern on the adhesive layer, and then forming a third protective resin layer on the routed optical fibers with a resin material which is the same as or different from that of the protective resin layer of the above-described optical interconnection apparatus. By repeatedly performing the steps of forming the third protective resin layer, an optical interconnection apparatus which includes many protective resin layers with optical fibers routed therein can be fabricated.

Further, a stacked structure can also be formed by fabricating plural optical interconnection apparatus of the third embodiment in advance by the above-described process and then adhereing together the protective resin layers of the plural optical interconnection apparatus. It is also possible to fabricate an optical interconnection apparatus, which includes optical fiber layers having a multi-layered structure and adapted to permit optical interconnections, by arranging an adhesive layer, for example, directly arranging an adhesive layer on a surface of a protective resin layer of one of the optical interconnection apparatus or transferring an adhesive layer onto the surface of the protective resin layer from an adhesive sheet on which the adhesive layer has been arranged in advance, and then mounting and adhering another one of the optical interconnection apparatus on and to the adhesive layer. By repeating the above-described procedures, an optical interconnection apparatus composed of a stacked structure having a greater multi-layered structure can also be fabricated.

In each of the optical interconnection apparatus according to the first to third embodiments of the present invention fabricated as described above, optical components such as optical connectors or optical modules are interconnected to the outwardly-extended end portions of the optical fibers.

For example, the end portions of the optical fibers, said end portions having been subjected to endface treatment to attach optical connectors, are interconnected to the optical connectors, or endfaces of optical fibers interconnected to optical connectors and endfaces of respective optical fibers located extending out from the optical interconnection apparatus are arc-fusion-spliced to each other.

EXAMPLES

The present invention will hereinafter be described by examples, but the present invention shall not be limited to them.

Example 1

Provided as a substrate was a base sheet (size: 210 mm×297 mm) with an acrylic adhesive coated to a thickness of 100 µm on a polyimide film of 125 µm in thickness. Upon routing optical fiber (product of The Furukawa Electric Co., Ltd., carbon-coated optical fibers, 250 µm in diameter) on the base sheet, 16 optical fibers were arranged in parallel with each other at pitches of 300 µm per port (an exit of optical fibers from an optical interconnection apparatus), and 8 ports (each port was formed of 16 optical fibers) were formed at pitches of 25 mm on each of opposite sides, i.e., shorter sides of the base sheet. Each optical fiber was routed extending from one of the shorter sides of the base sheet to the other shorter side. The routing to the individual ports on the opposite sides was designed to provide each of the optical fibers with desired free-access routing (128 fibers), and the routing of the optical fibers was adjusted to limit the maximum overlapped number of optical fibers to 3 fibers.

Around the base sheet with the optical fibers routed thereon, an edge-dam of 1.5 mm in width and 1 mm in height was then formed with a silicone-base sealing compound (filling compound; product of KONISHI CO., LTD., "BATH BOND"). A silicone gel coating material (product of Dow Corning Toray Silicone Co., Ltd., "SE 1880") was thereafter added dropwise to the inside of the edge-dam, and the silicone resin gel was cured under conditions of 120° C. and 1 hour, whereby an optical circuit board of 1.2 mm in thickness was fabricated. Mu connectors were then attached on the outwardly-extended ends of the optical fibers to obtain an optical circuit board as a final product.

Without flowing of the silicone resin gel coating material, which was employed for the formation of a protective resin layer, beyond edge faces of the base sheet with the optical fibers routed thereon owing to the arrangement of the edge-dam, the optical circuit board was obtained with the base sheet, the optical fibers, the protective resin layer and the edge-dam integrally united therein. Further, the ends of the optical fibers, said ends extending out through the individual ports, remained free from contamination with the coating material for the formation of the protective resin layer, and allowed to establish good attachment to optical connectors.

Further, owing to the arrangement of the protective resin layer, the routed optical fibers were held in place in the designed routing pattern by the protective resin layer without losing the routing pattern.

With respect to optical circuit board so fabricated, there were conducted a damp heat test (the board was left over for 5,000 hours at 75° C. and 90% RH) and a heat cyclic test (40° C. to 75° C., 500 cycles). Variations and fluctuations in optical loss were both 0.15 dB or less. The optical circuit boards were therefore found to be satisfactorily usable as optical interconnection apparatus.

Example 2

In a similar manner as in Example 1, 128 optical fibers were routed on a 125 µm polyimide film. Around the base sheet with optical fibers routed thereon, an edge-dam of 5 mm in width and 1 mm in thickness was then formed by using a nonwoven fabric made of polypropylene fibers (product of Tonen Tapyrus Co., Ltd., "P100SW-00X") in place of the silicone-base sealing compound employed in Example 1. The silicone gel coating material (product of Dow Corning Toray Silicone Co., Ltd., "SE1880") was thereafter added dropwise to the inside of the edge-dam. On the silicone gel coating material, a 125-µm polyimide film was overcoated to provide a protective layer, and the silicone resin gel was cured under conditions of 120° C. and 1 hour, whereby an optical circuit board of 1.35 mm in thickness was fabricated. MU connectors were then attached on outwardly-extended ends of the optical fibers to obtain an optical circuit board as a final product.

The silicone resin gel coating material, which was employed for the formation of a protective resin layer, was impregnated in the nonwoven fabric of the edge-dam, said nonwoven fabric being made of the polypropylene fibers, without flowing out beyond edge faces of the base sheet with the optical fibers routed thereon owing to the arrangement of the edge-dam, whereby the optical circuit board was obtained with the base sheet, the optical fibers, the protective resin layer, the protective layer and the edge-dam integrally united therein. Further, the ends of the optical fibers, said ends extending out through individual ports, remained free from contamination with the coating material for the formation of the protective resin layer, and allowed to establish good attachment to optical connectors.

Further, owing to the arrangement of the protective resin layer, the routed optical fibers were held in place in the designed routing pattern by the protective resin layer without losing the routing pattern.

With respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.2 dB or less. The optical circuit boards were therefore found to be satisfactorily usable as optical interconnection apparatus.

Example 3

An optical circuit board was fabricated in a similar manner as in Example 2 except that each port was formed of 8 optical fibers, MT connectors (8-fiber optical connectors) were used instead of the MU connectors, and the optical fibers were attached only on one ends thereof to MT connectors before the optical fibers were routed.

The silicone resin gel coating material, which was employed for the formation of a protective resin layer, was impregnated in the nonwoven fabric of an edge-dam, said nonwoven fabric being made of polypropylene fibers, without flowing out beyond edge faces of a base sheet with the optical fibers routed thereon owing to the arrangement of the edge-dam, whereby the optical circuit board was obtained with the base sheet, the optical fibers, the protective resin layer, a protective layer and the edge-dam integrally united therein. Further, the MT connectors attached in advance and ends of the optical fibers, said ends extending out through individual ports, remained free from contamination with the coating material for the formation of the protective resin layer, and allowed to establish good attachment to optical connectors.

Further, owing to the arrangement of the protective resin layer, the routed optical fibers were held in place in the designed routing pattern by the protective resin layer without losing the routing pattern.

With respect to the fabricated optical circuit board, there was conducted a damp heat test (the board was left over for 5,000 hours at 75° C. and 90% RH). Variations and fluctuations in optical loss were both 0.25 dB or less. The optical circuit board was therefore found to be satisfactorily usable as an optical interconnection apparatus. An optical loss was measured. It was found to be 0.8 dB or less including losses due to the interconnections with the optical connectors.

Example 4

An optical circuit board of 0.85 mm in thickness-was fabricated in a similar manner as in Example 3 except that a nonwoven fabric made of nylon fibers and having a width of 5 mm and a thickness of 500 $\mu$m (product of Tonen Tapyrus Co., Ltd., "IN050SS-00X") was used in place of the nonwoven fabric made of the polypropylene fibers, an epoxy resin (product of KYOEISHA CHEMICAL CO., LTD., "EPOLIGHT 400E") and an equivalent amount of a curing agent (product of Yuka Shell Epoxy K.K., "Epomate B002") were used as a resin material for the formation of a protective resin layer, the epoxy resin was cured under conditions of 150° C. and 1 hour, the total number of all optical fibers was 64 fibers, and the maximum overlapped number of optical fibers was 2 fibers.

The epoxy resin gel coating material, which was employed for the formation of the protective resin layer, was impregnated in the nonwoven fabric of an edge-dam, said nonwoven fabric being made of the nylon fibers, without flowing out beyond edge faces of a base sheet with optical fibers routed thereon owing to the arrangement of the edge-dam, whereby the optical circuit board was obtained with the base sheet, the optical fibers, the protective resin layer, a protective layer and the edge-dam integrally united therein. Further, optical connectors attached in advance and ends of the optical fibers, said ends extending out through individual ports, remained free from contamination with the coating material for the formation of the protective resin layer, and allowed to establish good attachment to optical connectors.

Further, owing to the arrangement of the protective resin layer, the routed optical fibers were held in place in the designed routing pattern by the protective resin layer without losing the routing pattern.

A loss of all the interconnected optical fibers was measured. It was found to be 0.6 dB or less including losses due to the attachment to the optical connectors. With respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.20 dB or less. The optical circuit boards were therefore found to be satisfactorily usable as optical interconnection apparatus.

Example 5

A glass-epoxy composite substrate having a thickness of 1.6 mm (size: 210 mm and 297 mm) with a 100 $\mu$m thick adhesive layer made of an acrylic pressure-sensitive adhesive was provided. That adhesive layer had been formed by forming it on a release film in advance and adhering it to the glass-epoxy composite substrate. In a similar manner as in Example 3, optical fibers with 8-fiber MT connectors attached in advance were routed, and by using the silicone-base filling compound (sealing compound, KONISHI CO., LTD, "BATH BOND"), an edge-dam of 5 mm in width and 800 $\mu$m in thickness was arranged around the glass-epoxy composite substrate on which the optical fibers had been routed. An optical circuit board was fabricated in a similar manner as in Example 3 except that a silicone rubber coating material (product of Toshiba Silicone Co., Ltd., "YE5822") was used as a resin material for the formation of a protective resin layer and the silicone rubber was cured under conditions of 100° C. and 1 hour.

Without flowing of the silicone rubber coating material, which was employed for the formation of the protective resin layer, beyond edge faces of the glass-epoxy composite substrate with the optical fibers routed thereon owing to the arrangement of the edge-dam, -,he optical circuit board was obtained with the substrate, the optical fibers, the protective resin layer and the edge-dam integrally united therein. Further, the optical connectors to which routing had been attached in advance remained free from contamination with the coating material for the formation of the protective resin layer.

Further, owing to the arrangement of the protective resin layer, the routed optical fibers were held in place in the designed routing pattern by the protective resin layer without losing the routing pattern.

With respect to the fabricated optical circuit board, there was conducted a damp heat test (the board was left over for 5,000 hours at 75° C. and 90% RH). Variations in optical loss were 0.30 dB or less. The optical circuit board was therefore found to be satisfactorily usable as an optical interconnection apparatus. An optical loss was measured. It was found to be 0.85 dB or less including losses due to the attachment to the optical connectors.

Example 6

An optical circuit board was fabricated in a similar manner as in Example 5 except that an ultraviolet-curing adhesive (product of OSAKA ORGANIC CHEMICAL INDUSTRY LTD., "Viscotak PM-654") was used as a resin material for the formation of a protective resin layer, ultraviolet rays of 20 mW/cm$^2$ were irradiated for 2 minutes, and a 125 $\mu$m thick polyimide film was adhered on the protective resin layer.

Without flowing of a coating material of the ultraviolet-curing adhesive, which was employed for the formation of the protective resin layer, beyond edge faces of a glass-epoxy composite substrate with optical fibers routed thereon owing to the arrangement of an edge-dam, the optical circuit board was obtained with the substrate, the optical fibers, the protective resin layer, the protective film and the edge-dam integrally united therein. Further, optical connectors which had been attached in advance remained free from contamination with the coating material for the formation of the protective resin layer.

Further, owing to the arrangement of the protective resin layer, the routed optical fibers were held in place in the designed routing pattern by the protective resin layer without losing the routing pattern.

With respect to the fabricated optical circuit board, there was conducted a damp heat test (the board was left over for 5,000 hours at 75° C. and 90% RH). Variations in optical loss were 0.20 dB or less. The optical circuit board was therefore found to be satisfactorily usable as an optical interconnection apparatus. An optical loss was measured. It was found to be 0.75 dB or less including losses due to the interconnections with the optical connectors.

Example 7

Provided was a base film (size: 210 mm×297 mm) with an acrylic adhesive coated to a thickness of 100 μm on one side of a polyimide film of 125 μm in thickness. On the film, optical fibers (product of The Furukawa Electric Co., Ltd., carbon-coated optical fibers, 250 μm in diameter) were routed to each port (an exit of optical fibers from an optical interconnection apparatus) as will be described next. Namely, 16 optical fibers were arranged in parallel with each other at pitches of 300 μm, and 8 ports (each port was formed of 16 optical fibers) were formed at pitches of 25 mm on each of opposite sides, i.e., shorter sides of the polyimide film. Each optical fiber was routed extending from one of the shorter sides of the polyimide film to the other shorter side. The routing to the individual ports on the opposite sides was designed to provide each of the optical fibers with desired free-access routing (128 fibers), and the routing of the optical fibers was adjusted to limit the maximum overlapped number of optical fibers to 3 fibers.

Along peripheral edges of the polyimide film with the optical fibers routed thereon, an edge-dam of 5 mm in width and 1 mm in thickness was then formed by using a non-woven fabric made of polypropylene fibers (product of Tonen Tapyrus Co., Ltd., "P100SW-00X"). The silicone gel coating material (product of Dow Corning Toray Silicone Co., Ltd., "SE1880") was thereafter added dropwise to the inside of the edge-dam, and the silicone gel was cured under conditions of 120° C. and 1 hour. A first protective resin layer was thus formed, whereby the optical fibers were held in place by the protective resin layer. Next, a second protective resin layer was formed on the back side of the polyimide film. Described specifically, another edge-dam of 5 mm in width and 0.45 mm in thickness was formed by using a nonwoven fabric made of polypropylene fibers (product of Tonen Tapyrus Co., Ltd., "PO40SW-00X"). The silicone gel coating material (product of Dow Corning Toray Silicone Co., Ltd., "SE1880") was thereafter added dropwise to the inside of the edge-dam, and the silicone gel was cured under conditions of 120° C. and 1 hour to form a second protective resin layer, whereby an optical circuit board of 1.7 mm in thickness was fabricated. MU connectors were then attached on outwardly-extended ends of the optical fibers to obtain an optical circuit board as a final product.

As the polyimide film was sandwiched between the protective resin layers formed from the silicone gel and having flexibility, the stiffness of the polyimide film was reduced. Therefore, the optical circuit board was pliant and had flexibility, and moreover, was planar without problems such as curls. To permit attachment to optical connectors, the optical fibers were subjected to endface treatment to strip their coatings. As a result, the optical fibers became very fragile. Even in the case of attachment of the coating-stripped, very fragile optical fibers to MU connectors, it was possible to achieve the attachment to the MU connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when an attempt was made to bend the fabricated optical circuit board through 180° at a radius of curvature of 15 mm, it was possible to easily bend the optical circuit board without breaking the same. No damage was left on the optical fibers either.

Further, owing to the arrangement of the protective resin layers, the routed optical fibers were held in place in the designed routing pattern by the protective resin layers without losing the routing pattern.

A loss of all the interconnected optical fibers was measured. It was found to be 0.7 dB or less including losses due to the interconnections with the optical connectors. Further, with respect to optical circuit boards so fabricated, there were conducted a damp heat test (the board was left over for 5,000 hours at 75° C. and 90% RH) and a heat cyclic test (−40° C to 75° C., 500 cycles). Variations and fluctuations in optical loss were both 0.2 dB or less. The optical circuit boards were therefore found to be satisfactorily usable as optical interconnection apparatus.

Example 8

An optical circuit board of 1.2 mm in thickness was fabricated in a similar manner as in Example 7 except that each port was formed of 8 optical fibers, MT connectors (8-fiber optical connectors) were used instead of the MU connectors, the optical fibers were attached only on one ends thereof to MT connectors before the optical fibers were routed, a nonwoven nylon fabric having a width of 5 mm and a thickness of 500 μm (product of Tonen Tapyrus Co., Ltd., "NO50SS-00X") was used in place of the nonwevon polyproylene fabric, an epoxy resin coating material formed of the epoxy resin (product of KYOEISHA CHEMICAL CO., LTD. "EPOLIGHT 400E") and an equivalent amount of the curing agent (product of Yuka Shell Epoxy K. K., "Epomate B002") was used as a material for a protective resin layer, the epoxy resin was cured at 150° C. and 1 hour, and as routing conditions of optical fibers, the total number of all optical fibers was 64 fibers and the maximum overlapped number of optical fibers was 2 fibers.

The MT connectors were then attached on outwardly-extended ends of the optical fibers to obtain an optical circuit board as a final product. As the polyimide film was sandwiched between the protective epoxy resin layers having flexibility, the stiffness of the polyimide film was reduced. Therefore, the optical circuit board was pliant and had flexibility, and moreover, was planar without problems such as curls. To permit attachment to optical connectors, the optical fibers were subjected to endface treatment to strip their coatings. As a result, the optical fibers became very fragile. Even in the case of attachment of the coating-stripped, very fragile optical fibers to the MT connectors at a rate of 8 cores to each MT connector at the same time, it was possible to achieve the attachment to the MT connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when the fabricated optical circuit board was bent through 180° at a radius of curvature of 20 mm, damage was left neither on the optical circuit board nor on the optical fibers.

Further, owing to the arrangement of the protective resin layers, the routed optical fibers were held in place in the designed routing pattern by the protective resin layers without losing the routing pattern.

A loss of all the interconnected optical fibers was measured. It was found to be 0.6 dB or less including losses due to the interconnections with the optical connectors. Further, with respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.3 dB or less. The optical circuit boards were therefore found to be satisfactorily usable as optical interconnection apparatus.

Example 9

Provided was a base film (size: 210 mm×297 mm) with an acrylic adhesive coated to a thickness of 100 $\mu$m on both sides of a 125-$\mu$m thick polyimide film and also with a release film adhered on one side of the polyimide film. In a similar manner as in Example 7, optical fibers were routed on the other side of the polyimide film. Using the silicone-base filling compound (product of KONISHI CO., LTD., "BATH BOND") instead of the nonwoven polypropylene fabric, an edge-dam of 1.5 mm in width and 1 mm in height was then formed along the peripheral edges of the polyimide film. The silicone rubber coating material (product of Toshiba Silicone Co., Ltd., "YE5822") was added dropwise to the inside of the edge-dam and was then cured at 100° C. for 1 hour to form a first protective resin layer, whereby the optical fibers were held in place in an embedded form.

Thereafter, the release film which was located on the back side of the polyimide film was removed, and on the adhesive layer, routing of 64 free-access optical fibers was conducted such that the total number of the optical fibers was 64 fibers and the maximum overlapped number of optical fibers was limited to 2 fibers. Using the silicone-base filling compound (product of KONISHI CO., LTD., "BATH BOND"), another edge-dam of 0.8 mm in width and 500 $\mu$m in height was then formed along peripheral edge portions of the polyimide film on which the optical fibers had been routed. The silicone rubber coating material (product of Toshiba Silicone Co., Ltd., "YE5822") was next added dropwise to the inside of the edge-dam and was then cured at 100° C. for 1 hour to form a second protective resin layer, whereby the optical fibers were held in place in an embedded form. Accordingly, an optical circuit board of 1.8 mm in thickness was fabricated.

MU connectors were then attached on outwardly-extended ends of the optical fibers to obtain an optical circuit board as a final product. As the polyimide film was sandwiched between the protective resin layers made of the silicone rubber and having flexibility, the stiffness of the polyimide film was reduced. Therefore, the optical circuit board was pliant and had flexibility, and moreover, was planar without problems such as curls. To permit attachment to optical connectors, the optical fibers were subjected to endface treatment to strip their coatings. As a result, the optical fibers became very fragile. Even in the case of attachment of the coating-stripped, very fragile optical fibers to the MU connectors, it was possible to achieve the attachment to the MT connectors without damaging the coating-stripped optical fibers.

When the optical circuit board was used for the interconnection of boards in a very limited space inside a rack, the flexibility, pliability and planarity of the optical circuit board made it possible to easily achieve interconnections between optical connectors attached to the optical circuit board and optical connectors with optical fibers routed in the boards. Further, when the fabricated optical circuit board was bent through 180° at a radius of curvature of 20 mm, damage was left neither on the optical circuit board nor on the optical fibers.

Further, owing to the arrangement of the protective resin layers, the routed optical fibers were held in place in the designed routing pattern by the protective resin layers without losing the routing pattern.

A loss of all the interconnected optical fibers was measured. It was found to be 0.8 dB or less including losses due to the interconnections with the optical connectors. Further, with respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.4 dB or less. The optical circuit boards were therefore found to be satisfactorily usable as optical interconnection apparatus.

Example 10

An optical interconnection apparatus was fabricated in a similar manner as in Example 7 except that the silicone rubber coating material (product of Toshiba Silicone Co., Ltd., "YE5822") was used instead of the silicone gel coating material and the silicone rubber was cured at 100° C. for 1 hour.

A second polyimide film of 125 $\mu$m in thickness was next provided. Using a silicone-base adhesive coating material [product of Dow Corning Toray Silicone Co., Ltd., SD4590/BY24-741/SRX212/toluene=100/1.0/0.9/50 (parts by weight)], both sides of the second polyimide film were coated by wire bar coating. After it was dried at100° C. for 3 minutes, adhesive layers of 50 $\mu$m in thickness were formed. A release film was adhered on one side, whereby a base film (size: 210 mm×297 mm) was prepared. After this second polyimide film was adhered to one side of the optical interconnection apparatus fabricated as described above, the release film on the back side of the second polyimide film was removed. On the exposed surface of the polyimide film, optical fibers (product of The Furukawa Electric Co., Ltd., carbon-coated optical fibers, 250 $\mu$m in diameter) were routed to each port (an exit of optical fibers from an optical interconnection apparatus) as will be described next. Namely, 16 optical fibers were arranged in parallel with each other at pitches of 300 $\mu$m, and 8 ports (each port was formed of 16 optical fibers) were formed at pitches of 25 mm on each of opposite sides, i.e., shorter sides of the polyimide film. Each optical fiber was routed extending from one of the shorter sides of the polyimide film to the other shorter side. The routing to the individual ports on the opposite sides was designed to provide each of the optical fibers with desired free-access routing (128 fibers), and the routing of the optical fibers was adjusted to limit the maximum overlapped number of optical fibers at 3 fibers.

Along peripheral edges of the second polyimide film with the optical fibers routed thereon, an edge-dam of 5 mm in width and 1 mm in thickness was then formed by using a nonwoven fabric made of polypropylene fibers (product of Tonen Tapyrus Co., Ltd., "P100SW-00X"). A silicone rubber coating material (product of Toshiba Silicone Co., Ltd., "TSE399") was thereafter added dropwise to the inside of the edge-dam, and the silicone rubber was cured under conditions of 25° C. and 24 hours. A third protective resin layer was thus formed, whereby the optical fibers were held in place in a form embedded in the protective resin layer. An optical interconnection apparatus of 3 mm in thickness was hence fabricated. MU connectors were then attached on outwardly-extended ends of the optical fibers to obtain an optical circuit board as a final product.

As the polyimide film was sandwiched between the protective resin layers formed from the silicone rubber and having flexibility, the stiffness of the polyimide film was reduced. Therefore, the optical circuit board was pliant and had flexibility, and moreover, was planar without problems such as curls. To permit attachment to optical connectors, the optical fibers were subjected to endface treatment to strip their coatings. As a result, the optical fibers became very fragile. Even in the case of attachment of the coating-stripped, very fragile optical fibers to MU connectors, it was possible to achieve the attachment to the MU connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when an attempt was made to bend the fabricated optical circuit board through 180° at a radius of curvature of 30 mm, it was possible to easily bend the optical circuit board without breaking the same. No damage was left on the optical fibers either.

Further, owing to the arrangement of the protective resin layers, the routed optical fibers were held in place in the designed routing pattern by the protective resin layers without losing the routing pattern.

With respect to the fabricated optical circuit board, an optical loss was measured. It was found to be 0.5 dB or less including losses due to the interconnections with the optical connectors. Further, with respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.2 dB or less. The optical circuit boards were therefore found to be satisfactorily usable as optical interconnection apparatus.

Example 11

Two optical interconnection apparatus, each of which was a structure that a polyimide film was sandwiched between a first and second protective resin layers, were fabricated in a similar manner as in Example 7 except that the silicone rubber coating material (product of Toshiba Silicone Co., Ltd., "TSE399") was used instead of the silicone gel coating material and the silicone rubber was cured under conditions of 100° C. and 24 hours.

On the second protective resin layer of one of the optical interconnection apparatus, the silicone-base adhesive coating material [product of Dow Corning Toray Silicone Co., Ltd., SD4590/BY24-741/SRX212/toluene=100/1.0/0.9/50 (parts by weight)] was next coated by dispenser coating. After it was dried at 100° C. for 3 minutes, an adhesive layer of 100 μm in thickness was formed. The other optical interconnection apparatus was stacked on and adhered to the adhesive layer, whereby an optical interconnection apparatus composed of a stacked structure of 3.5 mm in thickness was fabricated. MU connectors were then attached on outwardly-extended ends of the optical fibers to obtain an optical circuit board as a final product.

As the polyimide film was sandwiched between the protective resin layers formed from the silicone rubber and having flexibility, the stiffness of the polyimide film was reduced. Therefore, the optical circuit board was pliant and had flexibility, and moreover, was planar without problems such as curls. To permit interconnections to optical connectors, the optical fibers were subjected to endface treatment to strip their coatings. As a result, the optical fibers became very fragile. Even in the case of attachment of the coating-stripped, very fragile optical fibers to MU connectors, it was possible to achieve the attachment to the MU connectors without damaging the coating-stripped optical fibers.

When the optical circuit board was used for the interconnection of boards in a very limited space inside a rack, the flexibility, pliability and planarity of the optical circuit board made it possible to easily achieve interconnections between optical connectors attached to the optical circuit board and optical connectors with optical fibers routed in the boards. Further, when the fabricated optical circuit board was bent through 180° at a radius of curvature of 35 mm, damage was left neither on the optical circuit board nor on the optical fibers.

Further, owing to the arrangement of the protective resin layers, the routed optical fibers were held in place in the designed routing pattern by the protective resin layers without losing the routing pattern.

With respect to the fabricated optical circuit board, an optical loss was measured. It was found to be 0.8 dB or less including losses due to the interconnections with the optical connectors. Further, with respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.5 dB or less. The optical circuit boards were therefore found to be satisfactorily usable as optical interconnection apparatus.

Example 12

Two optical interconnection apparatus, in each of which a polyimide film was sandwiched between a first and second protective resin layers and optical fibers were routed on both sides of the polyimide film, were fabricated in a similar manner as in Example 9.

On the second protective resin layer of one of the optical interconnection apparatus, the silicone-base adhesive coating material [product of Dow Corning Toray Silicone Co., Ltd., SD4590/BY24-741/SRX212/toluene=100/1.0/0.9/50 (parts by weight)] was next coated by dispenser coating. After it was dried at 100° C. for 3 minutes, an adhesive layer of 100 μm in thickness was formed. The other optical interconnection apparatus was stacked on and adhered to the adhesive layer, whereby an optical interconnection apparatus composed of a stacked structure of 3.7 mm in thickness was fabricated. MU connectors were then attached on outwardly-extended ends of the optical fibers to obtain an optical circuit board as a final product.

As the polyimide film was sandwiched between the protective resin layers formed from the silicone rubber and having flexibility, the stiffness of the polyimide film was reduced. Therefore, the optical circuit board was pliant and had flexibility, and moreover, was planar without problems such as curls. To permit interconnections to optical connectors, the optical fibers were subjected to endface treatment to strip their coatings. As a result, the optical fibers became very fragile. Even in the case of attachment of the coating-stripped, very fragile optical fibers to MU connectors, it was possible to achieve the attachment to the MU connectors without damaging the coating-stripped optical fibers.

When the optical circuit board was used for the interconnection of boards in a very limited space inside a rack, the flexibility, pliability and planarity of the optical circuit board made it possible to easily achieve interconnections between optical connectors attached to the optical circuit board and optical connectors with optical fibers routed in the boards. Further, when the fabricated optical circuit board was bent through 180° at a radius of curvature of 35 mm, damage was left neither on the optical circuit board nor on the optical fibers.

Further, owing to the arrangement of the protective resin layers, the routed optical fibers were held in place in the designed routing pattern by the protective resin layers without losing the routing pattern.

With respect to the fabricated optical circuit board, an optical loss was measured. It was found to be 0.6 dB or less including losses due to the interconnections with the optical connectors. Further, with respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.4 dB or less. The optical circuit boards were therefore found to be satisfactorily usable as optical interconnection apparatus.

Example 13

Provided was an adhesive sheet (size: 210 mm×297 mm) with an acrylic adhesive coated to a thickness of 100 μm on a silicone-base release film of 75 μm in thickness. On the sheet, optical fibers (product of The Furukawa Electric Co., Ltd., carbon-coated optical fibers, 250 μm in diameter) were routed to each port (an exit of optical fibers from an optical interconnection apparatus) as will be described next. Namely, 16 optical fibers were arranged in parallel with each other at pitches of 300 μm, and 8 ports (each port was formed of 16 optical fibers) were formed at pitches of 25 mm on each of opposite sides, i.e., shorter sides of the adhesive sheet. Each optical fiber was routed extending from one of the shorter sides of the adhesive sheet to the other shorter side. The routing to the individual ports on the opposite sides was designed to provide each of the optical fibers with desired free-access routing (128 fibers), and the routing of the optical fibers was adjusted to limit the maximum overlapped number of optical fibers at 3 fibers.

Around the periphery of the adhesive sheet with the optical fibers routed thereon, an edge-dam of 5 mm in width and I mm in thickness was then formed by using a nonwoven fabric made of polypropylene fibers (product of Tonen Tapyrus Co., Ltd., "P100SW-00X). The silicone gel coating material (product of Dow Corning Toray Silicone Co., Ltd., "SE1880") was thereafter added dropwise to the inside of the edge-dam, and the silicone gel was cured under conditions of 120° C. and 1 hour. A protective resin layer was thus formed, whereby the optical fibers were held in place in a form embedded in the protective resin layer. Next, the silicone-base release film of the adhesive sheet, said release film being located on the back side, was peeled off, and on the exposed adhesive layer, a second protective resin layer was then formed. Described specifically, another edge-dam of 5 mm in width and 0.2 mm in thickness was formed by using a nonwoven fabric made of polypropylene fibers (product of Tonen Tapyrus Co., Ltd., "PO15SW-00X). The silicone gel coating material (product of Dow Corning Toray Silicone Co., Ltd., "SE1880") was thereafter added dropwise to the inside of the edge-dam, and the silicone gel was cured under conditions of 120° C. and 1 hour to form a second protective resin layer, whereby an optical circuit board of 1.3 mm in thickness was fabricated. MU connectors were then attached on outwardly-extended ends of the optical fibers to obtain an optical circuit board as a final product.

As the optical circuit board did not use any stiff substrate film and was formed of the silicone gel only, it was pliable and had flexibility. To permit interconnections to optical connectors, the optical fibers were subjected to endface treatment to strip their coatings. As a result, the optical fibers became very fragile. Even in the case of attachment of the coating-stripped, very fragile optical fibers to MU connectors, it was possible to achieve the attachment to the MU connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when an attempt was made to bend the fabricated optical circuit board through 180° at a radius of curvature of 15 mm, it was possible to easily bend the optical circuit board without breaking the same. No damage was left on the optical fibers either.

Further, owing to the arrangement of the protective resin layers, the routed optical fibers were held in place in the designed routing pattern by the protective resin layers without losing the routing pattern.

With respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.2 dB or less. The optical circuit boards were therefore found to be satisfactorily usable as optical interconnection apparatus.

Example 14

Prepared was an epoxy resin coating material, which was formed of the epoxy resin (product of KYOEISHA CHEMICAL CO., LTD., "EPOLIGHT 400E") and the curing agent (product of Yuka Shell Epoxy K.K., "Epomate B002") in an amount equivalent to the epoxy resin. On a silicone-base release film of 75 μm in thickness, the epoxy resin coating material was coated by roll coating. After the epoxy resin was cured at 150° C. for 1 hour, the silicone-base release film was peeled off, whereby a flexible epoxy resin layer of 50 μm in thickness was prepared.

The epoxy resin layer and an adhesive sheet, which had been prepared by an acrylic adhesive to a thickness of 100 μm on a 75 μm thick silicone-base release film, were adhered together and the silicone-base release film was peeled off, whereby a stacked structure (size: 210 mm×297 mm) formed of the epoxy resin layer and the acrylic adhesive layer was prepared.

On the acrylic adhesive layer of the stacked structure, optical fibers were routed in a similar manner as in Example 13 except that each port was formed of 8 optical fibers and was provided with an MT connector (8-fiber optical connector) instead of the MU connector, the total number of all optical fibers was 64 fibers, and the maximum overlapped number of optical fibers was 2 fibers. A protective resin layer was then formed in a similar manner as in Example 13, whereby an optical circuit board of 650 μm in thickness was fabricated. However, a nonwoven nylon fabric having a width of 5 mm and a thickness of 500 μm (product of Tonen Tapyrus Co., Ltd., "NO50SS-00X") was used in place of the nonwoven polypropylene fabric in Example 13, the epoxy resin (product of KYOEISHA CHEMICAL CO., LTD., "EPOLIGHT 400E") and the curing agent (product of Yuka Shell Epoxy K.K., "Epomate B002") in an amount equivalent to the epoxy resin were used as a protective layer material, and the epoxy resin was cured under conditions of 150° C. and 1 hour.

The MT connectors were then attached on outwardly-extended ends of the optical fibers to obtain an optical circuit board as a final product. As the optical circuit board did not use any stiff substrate film and was formed of the flexible epoxy resin only, it was pliable and had flexibility. To permit interconnections to optical connectors, the optical fibers were subjected to endface treatment to strip their coatings. As a result, the optical fibers became very fragile. Even in the case of attachment of the coating-stripped, very fragile optical fibers to the MT connectors at a rate of 8 cores to each MT connector at the same time, it was possible to achieve the attachment to the MT connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when the optical circuit board fabricated as described above was bent through 180° at a radius of curvature of 20 mm, damage was left neither on the optical circuit board nor on the optical fibers.

Further, owing to the arrangement of the protective resin layers, the routed optical fibers were held in place in the designed routing pattern by the protective resin layers without losing the routing pattern.

A loss of all the interconnected optical fibers was measured. It was found to be 0.6 dB or less including losses due to the interconnections with the optical connectors. Further, with respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.2 dB or less. The optical circuit boards were therefore found to be satisfactorily usable as optical interconnection apparatus.

Example 15

An optical circuit board was fabricated in a similar manner as in Example 14 except that a stacked structure was obtained by providing the ultraviolet-curing adhesive (product of OSAKA ORGANIC CHEMICAL INDUSTRY LTD., "Viscotak PM-654") as a coating material for the formation of an adhesive layer instead of using an adhesive sheet, coating the coating material by a dispenser on an epoxy resin layer, and then irradiating ultraviolet rays of 20 mW/cm² for 2 minutes to arrange a 50 μm thick adhesive layer.

MT connectors were then attached on outwardly-extended ends of the optical fibers to obtain an optical circuit board as a final product. As the optical circuit board did not use any stiff substrate film and was formed of the flexible epoxy resin only, it was pliable and had flexibility. To permit interconnections to optical connectors, the optical fibers were subjected to endface treatment to strip their coatings. As a result, the optical fibers became very fragile. Even in the case of attachment of the coating-stripped, very fragile optical fibers to the MT connectors at a rate of 8 cores to each MT connector at the same time, it was possible to achieve the attachment to the MT connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when the optical circuit board fabricated as described above was bent through 180° at a radius of curvature of 20 mm, damage was left neither on the optical circuit board nor on the optical fibers.

Further, owing to the arrangement of the protective resin layers, the routed optical fibers were held in place in the designed routing pattern by the protective resin layers without losing the routing pattern.

With respect to the fabricated optical circuit board, there was conducted a damp heat test (the board was left over for 5,000 hours at 75° C. and 90% RH). Variations in optical loss were 0.20 dB or less. The optical circuit board was therefore found to be satisfactorily usable as an optical interconnection apparatus. An optical loss was measured. It was found to be 0.75 dB or less including losses due to the interconnections with the optical connectors.

Example 16

An optical circuit board was fabricated in a similar manner as in Example 13 except that the silicone rubber coating material (product of Toshiba Silicone Co., Ltd., "YE5822") was used instead of the silicone gel coating material and the silicone rubber was cured under conditions of 100° C. and 1 hour.

MT connectors were then attached on outwardly-extended ends of the optical fibers to obtain an optical circuit board as a final product. As the optical circuit board did not use any stiff substrate film and was formed of the flexible silicone rubber only, it was pliable and had flexibility. To permit interconnections to optical connectors, the optical fibers were subjected to endface treatment to strip their coatings. As a result, the optical fibers became very fragile. Even in the case of attachment of the coating-stripped, very fragile optical fibers to the MT connectors at a rate of 16 cores to each MT connector at the same time, it was possible to achieve the attachment to the MT connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when the optical circuit board fabricated as described above was bent through 180° at a radius of curvature of 15 mm, damage was left neither on the optical circuit board nor on the optical fibers.

Further, owing to the arrangement of the protective resin layers, the routed optical fibers were held in place in the designed routing pattern by the protective resin layers without losing the routing pattern.

With respect to optical circuit boards so fabricated, there were conducted a damp heat test (the board was left over for 5,000 hours at 75° C. and 90% RH) and a heat cyclic test (−40° C. to 75° C., 500 cycles). Variations in optical loss were 0.30 dB or less. The optical circuit boards were therefore found to be satisfactorily usable as optical interconnection apparatus. An optical loss was measured. It was found to be 0.85 dB or less including losses due to the interconnections with the optical connectors.

Example 17

Using the silicone rubber coating material (product of Toshiba Silicone Co., Ltd., "YE5822"), a polyethylene terephthalate film of 75 µm in thickness was coated by roll coating. After the silicone rubber was cured under conditions of 100° C. and 1 hour, the cured coating was peeled off from the polyethylene terephthalate film, whereby a silicone rubber layer of 100 µm in thickness was formed.

The silicone-base adhesive coating material [product of Dow Corning Toray Silicone Co., Ltd., SD4590/BY24-741/SRX212/toluene=100/1.0/0.9/50 (parts by weight)] was coated on the silicone rubber layer by wire bar coating. After it was dried under conditions of 100° C. and 3 minutes, an adhesive layer of 50 µm in thickness was formed, whereby a stacked structure formed of the protective resin layer and the adhesive layer was obtained.

After optical fibers were routed on the adhesive layer of the thus-obtained stacked structure in a similar manner as in Example 13, an edge-dam of 5 mm in width and 1 mm in thickness was formed around the stacked structure, which carried the optical fibers routed thereon, by a nonwoven polypropylene fabric (product of Tonen Tapyrus Co., Ltd., "P100SW-00X"). The silicone rubber coating material (product of Toshiba Silicone Co., Ltd., "TSE399") was added dropwise to the inside of the edge-dam and the silicone rubber was then cured under conditions of 25° C. and 24 hours to form a protective resin layer, whereby an optical interconnection apparatus of 1.1 mm in thickness was fabricated.

MT connectors were then attached on outwardly-extended ends of the optical fibers to obtain an optical circuit board as a final product. As the optical circuit board did not use any stiff substrate film and was formed of the flexible silicone rubber only, it was pliable and had flexibility. To permit interconnections to optical connectors, the optical fibers were subjected to endface treatment to strip their coatings. As a result, the optical fibers became very fragile. Even in the case of attachment of the coating-stripped, very fragile optical fibers to the MT connectors at a rate of 16 cores to each MT connector at the same time, it was possible to achieve the attachment to the MT connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when the optical circuit board fabricated as described above was bent through 180° at a radius of curvature of 15 mm, damage was left neither on the optical circuit board nor on the optical fibers.

Further, owing to the arrangement of the protective resin layers, the routed optical fibers were held in place in the designed routing pattern by the protective resin layers without losing the routing pattern.

With respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.2 dB or less. The optical circuit boards were therefore found to be satisfactorily usable as optical interconnection apparatus.

Example 18

Provided was an adhesive sheet (size: 210 mm×297 mm) with an acrylic adhesive coated to a thickness of 100 µm on a silicone-base release film of 75 µm in thickness. In a similar manner as in Example 13, 128 optical fibers routed on the sheet to permit free accesses thereto.

Around the periphery of the adhesive sheet with the optical fibers routed thereon, an edge-dam of 5 mm in width and 1 mm in thickness was then formed by using a non-woven fabric made of polypropylene fibers (product of Tonen Tapyrus Co., Ltd., "P100SW-00X"). The silicone rubber coating material (product of Toshiba Silicone Co., Ltd., "TSE399") was thereafter added dropwise to the inside of the edge-dam, and the silicone rubber was cured under conditions of 25° C. and 24 hours. A first protective resin layer was thus formed, whereby the optical fibers were held in place in a form embedded in the protective resin layer. Next, the silicone-base release film of the adhesive sheet, said release film being located on the back side, was peeled off, and on the exposed adhesive layer, 128 optical fibers were routed to provide free accesses thereto in a similar manner as described above. Thereafter, around the periphery of the adhesive sheet with the optical fibers routed thereon, another edge-dam of 5 mm in width and 1 mm in thickness was formed by using a nonwoven fabric made of polypropylene fibers (product of Tonen Tapyrus Co., Ltd., "P100SW-00X"). The silicone rubber coating material (product of Toshiba Silicone Co., Ltd., "YE5822") was thereafter added dropwise to the inside of the edge-dam, and the silicone rubber was cured under conditions of 100° C. and 1 hour to form a second protective resin layer, whereby an optical circuit board of 2.1 mm in thickness was fabricated. MU connectors were then attached on outwardly-extended ends of the optical fibers to obtain an optical circuit board as a final product.

As the optical circuit board did not use any stiff substrate film and was formed of the silicone rubber only, it was pliable and had flexibility. To permit interconnections to optical connectors, the optical fibers were subjected to endface treatment to strip their coatings. As a result, the optical fibers became very fragile. Even in the case of attachment of the coating-stripped, very fragile optical fibers to MU connectors, it was possible to achieve the attachment to the MU connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when an attempt was made to bend the fabricated optical circuit board through 180° at a radius of curvature of 25 mm, it was possible to easily bend the optical circuit board without breaking the same. No damage was left on the optical fibers either.

Further, owing to the arrangement of the protective resin layers, the routed optical fibers were held in place in the designed routing pattern by the protective resin layers without losing the routing pattern.

With respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.2 dB or less. The optical circuit boards were therefore found to be satisfactorily usable as optical interconnection apparatus.

Example 19

In Example 13, an edge-dam of 1.5 mm in width and 1 mm in height was formed around the peripheral edges of a silicone-base release film by using, as a material for the edge-dam, a silicone-base filling compound (product of KONISHI CO., LTD., "BATH BOND" in place of the nonwoven fabric made of polypropylene fibers, and the silicone rubber coating material (product of Toshiba Silicone Co., Ltd., "YE 5822") was added dropwise to the inside of the edge-dam and the silicone rubber was cured under conditions of 100° C. and 1 hour to form a first protective resin layer, whereby optical fibers were held in place in an embedded form. Next, the silicone-base release film of the adhesive sheet, said release film being located on the back side, was peeled off, another edge-dam of 0.5 mm in width and 0.2 mm in height was formed around the peripheral edges of the exposed adhesive layer, the silicone rubber coating material (product of Toshiba Silicone Co., Ltd., "YE 5822") was added dropwise to the inside of the edge-dam and the silicone rubber was cured under conditions of 100° C. and 1 hour to arrange a second protective resin layer, whereby an optical circuit board of 1.3 mm in thickness was fabricated. MU connectors were then attached on outwardly-extended ends of the optical fibers to obtain an optical circuit board as a final product.

As the optical circuit board did not use any stiff substrate film and was formed of the silicone rubber only, it was pliable and had flexibility. To permit interconnections to optical connectors, the optical fibers were subjected to endface treatment to strip their coatings. As a result, the optical fibers became very fragile. Even in the case of attachment of the coating-stripped, very fragile optical fibers to MU connectors, it was possible to achieve the attachment to the MU connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when an attempt was made to bend the fabricated optical circuit board through 180° at a radius of curvature of 15 mm, it was possible to easily bend the optical circuit board without breaking the same. No damage was left on the optical fibers either.

Further, owing to the arrangement of the protective resin layers, the routed optical fibers were held in place in the designed routing pattern by the protective resin layers without losing the routing pattern.

With respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.2 dB or less. The optical circuit boards were therefore found to be satisfactorily usable as optical interconnection apparatus.

Example 20

In a similar manner as in Example 16, an optical interconnection apparatus was fabricated. Using the silicone-base adhesive coating material [product of Dow Corning Toray Silicone Co., Ltd., SD4590/BY24-741/SRX212/toluene=100/1.0/0.9/50 (parts by weight)], the second protective resin layer was coated by dispenser coating. The coating material was then dried under conditions of 100° C. and 3 minutes, whereby an adhesive layer of 100 $\mu$m in thickness was formed.

After optical fibers were routed on the adhesive layer of the thus-obtained stacked structure in a similar manner as in Example 13, an edge-dam of 1.5 mm in width and 1 mm in height was formed along the peripheral edges of the stacked structure, which carried the optical fibers routed thereon, by the silicone-base sealing compound (filling compound, product of KONISHI CO., LTD., "BATH BOND"). The silicone rubber coating material (product of Toshiba Silicone Co., Ltd., "YB5822") was added dropwise to the inside of the edge-dam and the silicone rubber was then cured under conditions of 100° C. and 1 hour. A third protective resin layer was thus formed to hold the optical fibers in place in an embedded form, whereby an optical interconnection apparatus of 2.4 mm in thickness was fabricated. MT connectors were then attached on outwardly-extended ends of the optical fibers to obtain an optical circuit board as a final product. As the optical circuit board did not use any stiff substrate film and was formed of the flexible silicone rubber only, it was pliable and had flexibility. To permit interconnections to optical connectors, the optical fibers were subjected to endface treatment to strip their coatings. As a result, the optical fibers became very fragile. Even in the case of attachment of the coating-stripped, very fragile optical fibers to the MT connectors at a rate of 16 cores to each MT connector at the same time, it was possible to achieve the attachment to the MT connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when an attempt was made to bend through 180° at a radius of curvature of 25 mm the optical circuit board fabricated as described above, it was possible to easy bend the optical circuit board without breaking the same, and no damage was left on the optical fibers either.

Further, owing to the arrangement of the protective resin layers, the routed optical fibers were held in place in the designed routing pattern by the protective resin layers without losing the routing pattern.

With respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.5 dB or less. The optical circuit boards were therefore found to be satisfactorily usable as optical interconnection apparatus.

Example 21

Two optical interconnection apparatus were fabricated in a similar manner as in Example 16. On the second protective resin layer of one of the optical interconnection apparatus, the silicone-base adhesive coating material [product of Dow Corning Toray Silicone Co., Ltd., SD4590/BY24-741/SRX212/toluene=100/1.0/0.9/50 (parts by weight)] was next coated by dispenser coating. After it was dried under conditions of 100° C. and 3 minutes, an adhesive layer of 100 $\mu$m in thickness was formed. The other optical interconnection apparatus was stacked on and adhered to the adhesive layer, whereby an optical interconnection apparatus composed of a stacked structure of 2.7 mm in thickness was fabricated.

MU connectors were then attached on outwardly-extended ends of the optical fibers to obtain an optical circuit board as a final product. As the optical circuit board did not use any stiff substrate film and was formed of the flexible silicone rubber only, it was pliable and had flexibility. To permit interconnections to optical connectors, the optical fibers were subjected to endface treatment to strip their coatings. As a result, the optical fibers became very fragile. Even in the case of attachment of the coating-stripped, very fragile optical fibers to the MT connectors at a rate of 16 cores to each MT connector at the same time, it was possible to achieve the attachment to the MT connectors without damaging the coating-stripped optical fibers.

When the optical circuit board was used for the interconnection of boards in a very limited space inside a rack, the flexibility and pliability of the optical circuit board made it possible to easily achieve interconnections between optical connectors attached to the optical circuit board and optical connectors with optical fibers routed in the boards. Further, when an attempt was made to bend the optical circuit board fabricated as described above through 180° at a radius of curvature of 30 mm, it was possible to easy bend the optical circuit board without breaking the same, and no damage was left on the optical fibers either.

Further, owing to the arrangement of the protective resin layers, the routed optical fibers were held in place in the designed routing pattern by the protective resin layers without losing the routing pattern.

With respect to optical circuit boards so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.6 dB or less. The optical circuit boards were therefore found to be satisfactorily usable as optical interconnection apparatus.

Capability of Exploitation in Industry

As has been described above, by arranging a protective resin layer having flexibility on routed optical fibers, the routed optical fibers are held in place in a designed routing pattern without displacements of the optical fibers (a loss in the intactness of the routing pattern), are not broken by external forces (pulling, bending, scratching and the like), and remain free from stresses which may develop optical losses. When base films having flexibility are used in the optical interconnection apparatus according to the first and second embodiments of the present invention, the optical interconnection apparatus are provided with pliability and flexibility. When a base film is sandwiched between protective resin layers and is not exposed as a surface layer, the base film is reduced in stiffness and becomes pliable and flexible even if, as the base film, a base film having a certain degree of stiffness is used. In the optical interconnection apparatus according to the third embodiment of the present invention, the routed plural optical fibers are held in place in a form embedded in the protective resin layer having flexibility and, as no still substrate is included, the optical interconnection apparatus is pliable and has flexibility. In summary, each optical interconnection apparatus according to the present invention is composed only of routed optical fibers and a protective resin layer or only of routed optical fibers, an adhesive layer and a protective resin layer. As the base film is not provided on both sides thereof with base films having no stretchability despite their flexibility, such as "Mylar" or "Kapton" films, the flexibility of the optical interconnection apparatus itself is very high.

Accordingly, even upon attaching on the ends of the optical fibers of the optical interconnection apparatus of the present invention to optical components such as optical connectors, said ends extending out from the optical interconnection apparatus of the present invention and having been subjected to endface treatment to strip coatings for the attachment to the optical components, the ends can be easily attached to the optical components such as optical connectors without damaging the coating-stripped, very fragile optical fibers. In the fabrication of optical interconnection apparatus, the yield has been significantly improved compared with the conventional techniques.

When the optical interconnection apparatus according to the present invention are provided on both sides thereof with protective resin layers and especially when the protective resin layers are formed of the same resin material, the optical interconnection apparatus is free of a problem even when the protective resin layers are heated and cured upon fabrication, such as curling which may occur due to a difference in the coefficients of linear expansion of resin materials, so that planarity is maintained. Even when the optical fibers extending out from the thus-obtained optical interconnection apparatus are attached to optical components such as optical connectors, no extra stress is therefore applied to the optical components such as optical connectors so that an optical loss or the like, which takes place by the interconnections, is limited at a very low level.

Further, even when employed for interconnections in a very limited space, for example, for the interconnection of boards in a rack, its pliability and planarity make it possible to easily perform interconnections between optical components such as connectors attached to the optical interconnection apparatus and optical components such as optical connectors extended out from routed optical fibers in the board, and hence, the workability is improved substantially. Moreover, it is no longer necessary to form extended tabs for facilitating the interconnections. Therefore, the production of the optical interconnection apparatus is easy and upon mounting, it does not occupy a large space. In addition, the optical interconnection apparatus can be readily multilayered to route and accommodate a number of optical fibers, and is useful as a high-density optical circuit board.

What is claimed is:

1. An optical interconnection apparatus characterized in that said optical interconnection apparatus comprises a substrate having a two-dimensional plane, a protective resin layer arranged on at least one side of said substrate and having flexibility, and plural optical fibers routed on said at least one side of said substrate and provided at opposite ends thereof with end portions adapted to permit optical interconnections thereto; and said routed optical fibers are held in place in a form embedded in said protective resin layer.

2. An optical interconnection apparatus according to claim 1, wherein said optical fibers are carbon-coated optical fibers.

3. An optical interconnection apparatus according to claim 1,
wherein said protective resin layer is formed of a gel-like or rubbery organic material.

4. An optical interconnection apparatus according to claims 1,
wherein said protective resin layer is formed of a setting resin having flexibility.

5. An optical interconnection apparatus according to claim 1, wherein
said protective resin layer is formed of a thermoplastic resin having flexibility.

6. An optical interconnection apparatus according to claim 1,
wherein said substrate having a two-dimensional plane is a base film having flexibility.

7. An optical interconnection apparatus according to claim 1,
wherein said protective resin layer has been formed by filling a resin material inside an edge-dam member arranged along or in a vicinity of a peripheral edge of said substrate associated with said protective resin layer.

8. An optical interconnection apparatus according to claim 7, wherein said edge-dam member is formed of a nonwoven fabric made of organic fibers or a nonwoven fabric made of glass fibers.

9. An optical interconnection apparatus according to claim 7, wherein said edge-dam member is formed of a sealing compound which comprises a silicone-base, epoxy-base, urethane-base or acrylic resin.

10. An optical interconnection apparatus characterized in that said optical interconnection apparatus comprises at least two base films having two-dimensional planes, protective resin layers having flexibility and arranged on said respective base films and between said base films, respectively, plural optical fibers routed on at least one sides of said respective base films and provided at opposite ends thereof with end portions adapted to permit optical interconnections thereto; said routed optical fibers are held in place by associated ones of said protective resin layers, respectively; and said respective base films are sandwiched by said protective resin layers, whereby a stacked structure is formed.

11. An optical interconnection apparatus according to claim 10, wherein said protective resin layers are arranged on opposite sides of said base films, respectively; and said protective resin layers on one sides of said base films are joined together directly or via an adhesive.

12. An optical interconnection apparatus characterized in that said optical interconnection apparatus comprises plural optical fibers routed two-dimensionally and provided at ends thereof with end portions adapted to permit optical interconnections, and two protective resin layers having flexibility and stacked via an adhesive layer, wherein at least one of said protective resin layers holds said optical fibers in place in a form embedded therein.

13. An optical interconnection apparatus according to claim 12, wherein said protective resin layer or each of said protective resin layers has been formed by filling a resin material inside an edge-dam member arranged along or in a vicinity of a peripheral edge of another optical interconnection apparatus.

14. An optical interconnection apparatus according to claim 13, wherein said edge-dam member is formed of a nonwoven fabric made of organic fibers or a nonwoven fabric made of glass fibers.

15. An optical interconnection apparatus according to claim 13, wherein said edge-dam member is formed of a sealing compound which comprises a silicone-base, epoxy-base, urethane-base or acrylic resin.

16. An optical interconnection apparatus characterized in that said optical interconnection apparatus comprises plural optical fibers routed two-dimensionally and provided at ends thereof with end portions adapted to permit optical interconnections and three or more protective resin layers having flexibility and stacked one over the other via an adhesive layer; wherein at least two of said protective resin layers hold said optical fibers in place in a form embedded therein.

17. A process for the fabrication of an optical interconnection apparatus, characterized in that said process comprises routing plural optical fibers on a base film having a two-dimensional plane such that said optical fibers are provided at opposite ends thereof with end portions to be adapted to permit optical interconnections, arranging an edge-dam member along or in a vicinity of a peripheral edge of said base film, and filling a resin material inside said edge-dam member to form a protective resin layer on the routed optical fibers.

18. A process for the fabrication of an optical interconnection apparatus, characterized in that said process comprises routing plural optical fibers on one of sides of a base film having a two-dimensional plane such that said optical fibers are provided at opposite ends thereof with end portions to be adapted to permit optical interconnections, forming a first protective resin layer having flexibility such that said optical fibers so routed are held in place in a form embedded in said first protective resin layer, and then forming on the other side of said base film a second protective resin layer having flexibility and made of a resin material which is the same as or different from that of said first protective resin layer.

19. A process for the fabrication of an optical interconnection apparatus, characterized in that said process comprises stacking another base film having a two-dimensional plane over one of protective resin layers of said optical interconnection apparatus fabricated by the fabrication process of claim 18, routing plural optical fibers on another base film such that said optical fibers are provided at opposite ends thereof with end portions to be adapted to permit optical interconnections, and then forming a third protective resin layer having flexibility such that said optical fibers so routed are held in place in a form embedded in said third protective resin layer, whereby a stacked structure is fabricated.

20. A process for the fabrication of an optical interconnection apparatus, characterized in that said process comprises stacking a base film having a two-dimensional plane over one of protective resin layers of said optical interconnection apparatus fabricated by the fabrication process of claim 19, routing plural optical fibers on said base film such that said optical fibers are provided at opposite ends thereof with end portions to be adapted to permit optical interconnections, and then forming a protective resin layer having flexibility such that said optical fibers so routed are held in place in a form embedded in said protective resin layer; and then repeating said steps to form a stacked structure which comprises said plural base films and said plural protective resin layers with said corresponding optical fibers held in place therein.

21. A process for the fabrication of an optical interconnection apparatus, characterized in that said process comprises adhering together protective resin layers of plural optical interconnection apparatus fabricated by the fabrication process of claim 18, whereby a stacked structure comprising plural base films and plural protective resin layers with corresponding optical fibers held in place therein is formed.

22. A process for the fabrication of an optical interconnection apparatus, characterized in that said process comprises routing plural optical fibers on one of sides of a base film having a two-dimensional plane such that said optical fibers are provided at opposite ends thereof with end portions to be adapted to permit optical interconnections, forming a first protective resin layer having flexibility such that said optical fibers so routed are held in place, routing plural optical fibers on the other side of said base film such that said optical fibers are provided at opposite ends thereof with end portions to be adapted to permit optical interconnections, and then forming a second protective resin layer, which has flexibility and is made of the same or different resin material as or from that of said first protective resin layer, such that said optical fibers so routed are held in place in a form embedded in said first protective resin layer.

23. A process for the fabrication of an optical interconnection apparatus, characterized in that said process comprises routing plural optical fibers on an adhesive layer of a stacked structure, which comprises a first protective resin layer having flexibility and said adhesive layer, such that said optical fibers are provided at opposite ends thereof with end portions to be adapted to permit optical interconnections, and then forming on said optical fibers a second protective resin layer, which has flexibility and is made of the same or different resin material as or from that of said first protective resin layer, to hold said optical fibers in place in a form embedded in said second protective resin layer.

24. A fabrication process according to claim 23, wherein said stacked structure has been fabricated by forming a protective resin layer having flexibility on a release film having a two-dimensional plane, removing said release film from said protective resin layer, and forming an adhesive layer on said protective resin layer.

25. A process for the fabrication of an optical interconnection apparatus, characterized in that said process comprises routing, on an adhesive layer of an adhesive film composed of a release film having a two-dimensional plane and said adhesive layer located on said release film, plural optical fibers such that said optical fibers are provided at opposite ends thereof with end portions to be adapted to permit optical interconnections, forming a first protective resin layer having flexibility on said routed optical fibers to hold said optical fibers in place, peeling off said release film on a back side, and then forming over the thus-exposed adhesive layer a second protective resin layer having flexibility and made of the same or different resin material as or from that of said protective resin layer.

26. A process for the fabrication of an optical interconnection apparatus, characterized in that said process comprises routing plural optical fibers on one of protective resin layers of an optical interconnection apparatus fabricated by the fabrication process of claim 25, and then repeating said steps to form a stacked structure which comprises said plural protective resin layers with said corresponding plural optical fibers held in place therein.

27. A process for the fabrication of an optical interconnection apparatus, characterized in that said process comprises routing, on an adhesive layer of an adhesive film composed of a release film having a two-dimensional plane and said adhesive layer located on said release film, plural optical fibers such that said optical fibers are provided at opposite ends thereof with end portions to be adapted to permit optical interconnections, forming a first protective resin layer having flexibility on said routed optical fibers to hold said optical fibers in place, peeling off said release film on a back side, routing on the thus-exposed adhesive layer plural optical fibers such that said optical fibers are provided at opposite ends thereof with end portions to be adapted to permit optical interconnections, forming on said routed optical fibers a second protective resin layer having flexibility and made of the same or different resin material as or from that of said protective resin layer to hold said optical fibers in place.

* * * * *